United States Patent [19]
Friesem et al.

[11] Patent Number: 5,682,255
[45] Date of Patent: Oct. 28, 1997

[54] HOLOGRAPHIC OPTICAL DEVICES FOR THE TRANSMISSION OF OPTICAL SIGNALS OF A PLURALITY OF CHANNELS

[75] Inventors: Asher Albert Friesem; Yaakov Amitai, both of Rehovot, Israel

[73] Assignee: Yeda Research & Development Co. Ltd., Rehovot, Israel

[21] Appl. No.: 505,315

[22] PCT Filed: Feb. 23, 1994

[86] PCT No.: PCT/US94/01763

§ 371 Date: Nov. 13, 1995

§ 102(e) Date: Nov. 13, 1995

[87] PCT Pub. No.: WO94/19712

PCT Pub. Date: Sep. 1, 1994

[30] Foreign Application Priority Data

Feb. 26, 1993 [IL] Israel ............................. 104877
Jun. 15, 1993 [IL] Israel ............................. 106020

[51] Int. Cl.⁶ .................... G02B 5/18; G02B 5/32; G02B 6/28
[52] U.S. Cl. ............ 359/15; 359/19; 359/24; 359/629; 359/634; 385/24; 385/37
[58] Field of Search .................. 359/15, 16, 19, 359/24, 629, 634; 385/24, 37

[56] References Cited

U.S. PATENT DOCUMENTS

| | | |
|---|---|---|
| 3,970,357 | 7/1976 | Moraw et al. |
| 4,235,442 | 11/1980 | Nelson. |
| 4,248,093 | 2/1981 | Andersson et al. |
| 4,249,744 | 2/1981 | Bromley. |
| 4,367,876 | 1/1983 | Kotoyori. |
| 4,407,564 | 10/1983 | Ellis. |
| 4,624,462 | 11/1986 | Itkis. |
| 4,671,603 | 6/1987 | McQuoid et al. ........... 359/15 |
| 4,711,512 | 12/1987 | Upatnieks. |
| 4,768,853 | 9/1988 | Bhagavatula ............... 385/37 |
| 4,946,253 | 8/1990 | Kostuck. |
| 4,998,787 | 3/1991 | Caputi et al. |
| 5,013,047 | 5/1991 | Schwab. |
| 5,061,027 | 10/1991 | Richard ..................... 385/37 |
| 5,082,286 | 1/1992 | Ryan. |
| 5,101,460 | 3/1992 | Richard ..................... 359/19 |
| 5,111,314 | 5/1992 | Leib. |
| 5,119,454 | 6/1992 | McMahon .................. 359/629 |
| 5,159,473 | 10/1992 | Feldman. |
| 5,188,368 | 2/1993 | Ryan. |
| 5,224,198 | 6/1993 | Jachimowicz et al. ...... 359/15 |
| 5,237,434 | 8/1993 | Feldman et al. ........... 385/37 |
| 5,448,659 | 9/1995 | Tsutsui et al. ............. 385/37 |
| 5,455,693 | 10/1995 | Wreede et al. ............. 359/15 |
| 5,486,934 | 1/1996 | Huang ....................... 359/15 |
| 5,500,912 | 3/1996 | Alonas et al. ............. 359/15 |
| 5,515,184 | 5/1996 | Caulfield et al. .......... 359/15 |

FOREIGN PATENT DOCUMENTS

94/19712  9/1994  WIPO.

OTHER PUBLICATIONS

Moslehi, B., et al., Fiber-optic wavelength-division multiplexing using volume holographic gratings, *Optics Letters*, 1989, vol. 14, No. 19, pp. 1088-1090.

Amitai, Y., et al., Design of substrate-mode holographic interconnects with different recording and readout wavelengths, *Applied Optics*, 1991, V. 30, No. 17, pp. 2376-2381.

(List continued on next page.)

*Primary Examiner*—Jon W. Henry
*Attorney, Agent, or Firm*—Ladas & Parry

[57] ABSTRACT

A holographic optical device includes a light-transmissive substrate, a first holographic optical element, and a second holographic optical element that is laterally disposed on the substrate from the first holographic optical element. At least one of the holographic optical elements is a complex diffraction grating that can handle a multiplicity of plane and/or spherical waves arriving from a range of angles, and having a range of wavelengths. Applications for the device include a wavelength division multiplexer/demultiplexer, an image reconstructor, a beam expander/compressor, and a visor/head-up display.

7 Claims, 24 Drawing Sheets

Side View

OTHER PUBLICATIONS

Winzer, G., Wavelength Multiplexing Components—A Reivew of Single–Mode Devices and Their Applications, *IEEE Journal of Lightwave Technology*, 1984, vol. LT–2, No. 4, pp. 369–378.

Carlsen, W.J., et al., Flat passband birefringent wavelength–division multiplexers, *Electronics Letters*, 1987, vol. 23, No. 3, pp. 106–107.

Hillerich, B., et al., Wide Passband Grating Multiplexer for Multimode Fibers, *IEEE Journal of Lightwave Technology*, 1985, vol. LT–3, No. 3, pp. 590–594.

Inoue, K., et al., Tunable optical multi/demultiplexer for optical FDM transmission system, *Electronics Letters*, 1985, vol. 21, pp. 387–389.

Kishioka, K., Improvement of the power spectral response in three–guided coupler demultiplexer, *Applied Optics*, 1990, vol. 29, No. 3, pp. 360–366.

Kogelnik, H., Coupled Wave Theory for Thick Hologram Gratings, *The Bell System Technical Journal*, 1969, vol. 48, No. 9, pp. 2909–2947.

Solymar, L., et al., One–dimensional Coupled Wave Theory, *Volume Holography and Volume Grating*, 1981, Academic Press, London, pp. 76–113.

Lin, F., et al., Optical multiplanar VLSI interconnects based on multiplexed waveguide holograms, *Applied Optics*, 1990, vol. 29, No. 8, pp. 1126–1133.

Lin, F., et al., Highly parallel single–mode multiplanar holographic interconnects, *Optical Letters*, 1991, vol. 16., No. 3, pp. 183–185.

Top View

|         | $\lambda_1$ | $\lambda_2$ |
|---------|------|------|
| $\mathcal{H}_1^s$ | 68%  | 0.5% |
| $\mathcal{H}_2^s$ | 0.1% | 65%  |
| $\mathcal{H}_1^r$ | 82%  | 0.9% |
| $\mathcal{H}_2^r$ | 1.5% | 79%  |

Fig. 7

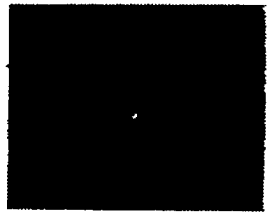
$\beta = 5°$  $\alpha = 4°$
$\beta = 0°$  $\alpha = 4°$
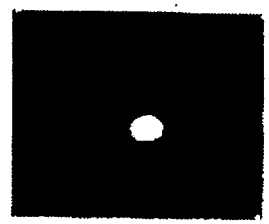
$\beta = -5°$  $\alpha = 4°$
*Diffraction limit ≈ 33μ*
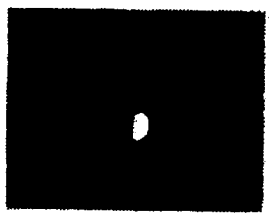
$\beta = 6°$  $\alpha = 0°$
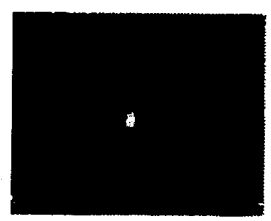
$\beta = 0°$  $\alpha = 0°$
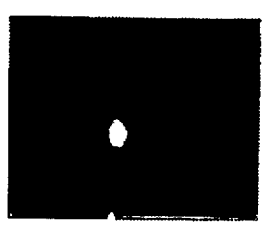
$\beta = -6°$  $\alpha = 0°$
FIG. 25

HOLOGRAPHIC OPTICAL DEVICES FOR THE TRANSMISSION OF OPTICAL SIGNALS OF A PLURALITY OF CHANNELS

FIELD AND BACKGROUND OF THE INVENTION

The present invention relates to holographic optical devices, and particularly to devices which include a plurality of holographic optical elements (HOEs) carried by a common light-transmissive substrate. The invention is capable of being implemented in a large member of applications. Described below, for purposes of example, are the following implementations: division multiplexing/demultiplexing systems; compact holographic displays; compact holographic beam expanders and compressors; and holographic visor or head-up displays.

Recently, there have been significant advances in optical fibers technology for telecommunication systems. One of the proposed methods to exploit more efficiently the high potential bandwidth of optical fibers is by wavelength division multiplexing (WDM). With this technique, a large number of communication channels can be transmitted simultaneously over a single fiber. During the last decade, various systems for implementing WDM have been proposed, including systems based on birefringent materials, surface relief gratings, Mach-Zender interferometry, and waveguides. Unfortunately, these proposed systems generally suffer from low efficiencies or from a strict limitation on the number of channels.

Another proposed approach is to use a thick reflection hologram as described in N. Moslehi, P. Harvey, J. Ng and T. Jannson, Opt. Left. 14,(1989) 1088. However, the necessity to use a conventional aspheric lens for collimating and/or focusing the light waves makes the system bulky and space consuming. Furthermore, a single holographic element is very sensitive to the signal's wavelength which usually depends strongly on temperature. One application of the present invention described below enables wavelength division multiplexers/demultiplexers to be constructed having advantages in the above respects.

The invention also enables improved holographic displays to be constructed. Since its inception three decades ago, there has been significant progress in the area of display holography. Indeed, it has become so popular as to play an important role in advertising, packaging and even in art. Yet, the current form of display holograms has some severe drawbacks. The necessity to use a readout light source that must be located at some distance from the hologram, in order to illuminate its whole surface, makes the holographic display systems bulky, space consuming, and sometimes inconvenient to use. Another drawback is that the transmitted part of the readout wave, which is not diffracted by the holograms, usually bothers the observer.

Recently, there have been several proposals, based on edge-illuminated holograms for constructing compact displays that overcome the above drawbacks. The salient feature of these proposals is to reconstruct the holograms with a readout wave which enters the hologram substrate through a polished edge so as to reach the emulsion at a large angle of incidence. Unfortunately, the necessity to enter the readout wave through the hologram's edge introduces some problems, such as the need for a special cover plate (thick, with polished edges), and the requirement of very accurate alignment of the readout wave. Also, the edge-illuminated holograms are very sensitive to the readout wavelength, so the hologram must be reconstructed with purely monochromatic light.

Another important application of the present invention is in providing a compact holographic display which has advantages in the above respects.

A further application of the invention is to provide a compact beam expander or compressor. Beam expanders for magnifying a narrow collimated beam into a beam of larger diameter are typically comprised of a telescopic assembly of two lenses along a common axis and having a common focal point. When used with polychromatic light, e.g., while light, refractive lenses are generally needed. However, with monochromatic light, such as from lasers or other monochromatic sources, it may be advantageous to exploit holographic lenses. The present invention provides a beam expander or compressor which can be used with both monochromatic light as well as polychromatic light.

Another important application for holographic optical elements (HOEs) is in visor displays. There a HOE serves as an imaging lens and a combiner, where a two-dimensional quasi-monochromatic display is imaged to infinity and reflected into an observer's eye. The display can be derived either directly from a CRT or indirectly by means of a relay lens or an optical fiber bundle. Typically, the display is comprised of an array of points whose geometry at readout differs from that at recording. As a result, the imaged array contains aberrations that decrease the image quality. In addition, it is often necessary to record the HOEs at a wavelength that differs from the readout wavelength. This is particularly true when the read-out wavelength is not suitable for recording the .HOEs. Such a wavelength shift introduces additional aberrations.

Another problem, which is usually common to all types of diffractive optical elements, is their relatively high chromatic dispersion. This is a major drawback in applications where the light source is a CRT which is not purely monochromatic.

Recently several new designs were proposed for improving the performance of holographic lenses. These designs, which only deal with single HOEs, compensate for the geometric and chromatic aberrations by using nonspherical waves rather than simple spherical waves for recording. However, they do not overcome the chromatic dispersion problem.

The present invention may also be used for designing and recording HOEs for visor displays in which both the aberrations and chromatic dispersions are minimized. It is particularly advantageous because it is very compact and can be readily incorporated even into optical systems that have specialized configurations

OBJECTS AND BRIEF SUMMARY OF THE INVENTION

According to a broad aspect of the present invention, therefore, there is provided a holographic optical device, comprising: a light-transmissive substrate; a first holographic optical element carried by the substrate; and a second holographic optical element carried by the substrate laterally of the first holographic optical element; characterized in that at least one of the holographic optical elements is a complex diffraction grating that can handle a multiplicity of plane waves and/or spherical waves arriving from a range of angles, and/or having a range of wavelengths.

As indicated earlier, one application of the invention is as a novel wavelength division multiplexer/demultiplexer, in which the device serves for the transmission of optical signals of a plurality of channels of different wavelengths between (a) a plurality of optical transmission paths, one for each channel, and (b) a single optical transmission path for all the channels. In this application, the holographic optical elements include: a single hologram aligned with the single optical transmission path and having a plurality of holographic optical elements, one for each of the channels; and a plurality of holograms, each aligned with one of the plurality of optical transmission paths and having a holographic optical element for the channel of the respective path.

In further described applications of the invention, the first holographic optical element is constructed to convert an input beam of light into a diverging spherical wave at a high off-axis angle such that the wave propagates by total internal reflection towards the second holographic optical element to illuminate the second holographic optical element and to emerge from the substrate by means of the second holographic optical element. In one such application, the second holographic optical element is a display hologram illuminated by the internally reflected light from the first holographic optical element so as to reconstruct a three-dimensional image.

According to additional applications of the invention, the first and second holographic optical elements are both holographic lenses. These lenses may be constructed such that the lateral dimensions of the light beam emerging from the substrate at the second holographic lens is either a magnification, or a de-magnification, of the lateral dimensions of the light beam entering the substrate to the first holographic lens, so as to provide a beam expander or compressor which can be used with both monochromatic light as well as polychromatic light.

A still further application of the invention described below is a holographic visor display or head-up display. In this application, the first holographic optical element collimates the waves from each data point in a display into a plane wave that is trapped inside the substrate by total internal reflection, and the second holographic optical element constitutes the complex diffraction grating and diffracts the plane waves into the eye of an observer.

BRIEF DESCRIPTION OF THE DRAWINGS

The invention is herein described, by way of example only, with reference to the accompanying drawings, wherein:

FIG. 7 is a table also helpful in understanding the invention and its advantages, as to be described more particularly below;

FIGS. 17a and 17b are enlarged fragmentary views helpful in understanding the operation of the planar holographic lens of FIG. 17;

FIG. 25 illustrates experimental spot size in the focal plane in the corrected visor display of FIG. 22;

MULTIPLEXER-DEMULTIPLEXER
APPLICATION (FIGS. 1–10)

Figure 1:
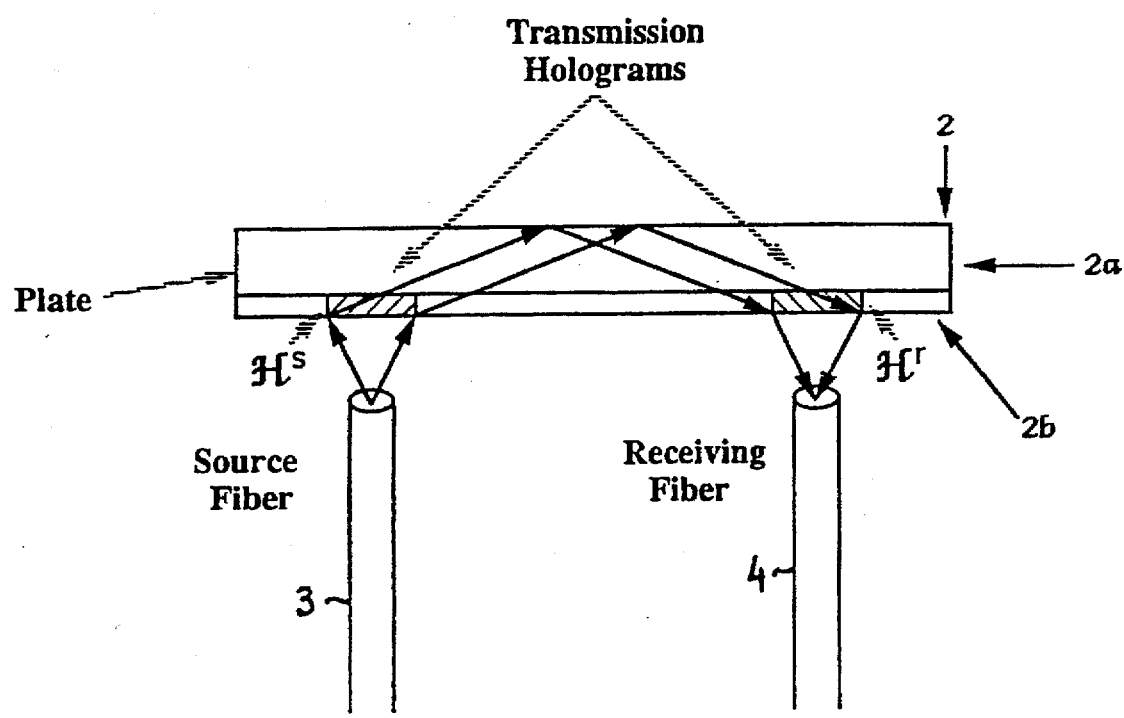
FIG. 1 is a diagram helpful in explaining the novel system of the present invention.

Basic Building Block (FIG. 1)

The basic building block in this application is illustrated in FIG. 1. This basic building block includes a holographic device 2 including a light transmissive substrate or plate 2a having an emulsion coating 2b thereon linking a source fiber 3 and a receiving fiber 4. The holographic device 2 has recorded on its emulsion coating two identical holographic optical elements (HOEs) Hs and Hr. The first HOE Hs collimates the light emerging from the source fiber 3 into a plane wave which is then trapped inside the plate by total internal reflection. The second HOE Hr focuses the collimated wave onto a receiving fiber 4. As shown by the publication Y. Amitai and J. W. Goodman, Appl. Opt. 30,(1991) 2376, which is hereby incorporated by references, such a building block can be recorded with predistorted wavefronts to achieve nearly diffraction limited imaging and high diffraction efficiencies, even in the presence of recording-readout wavelength shift.

The implementation of FIGS. 2–7

Figure 2:
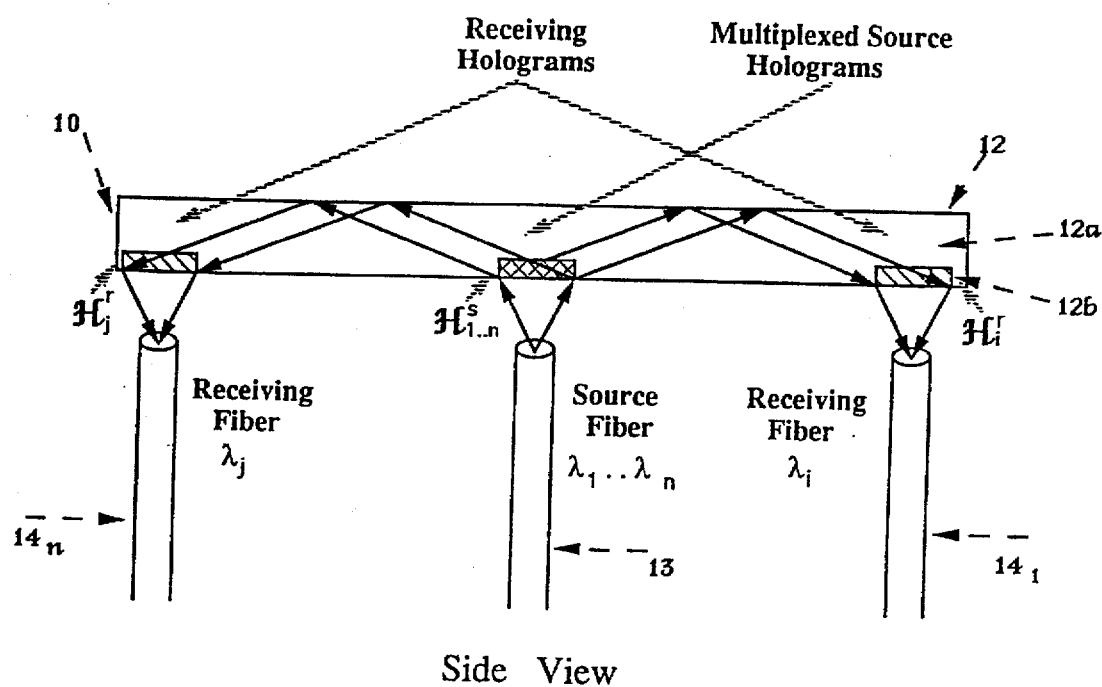
FIG. 2 is a side view diagrammatically illustrating a wavelength division demultiplexing system in accordance with the present invention.
Figure 3:
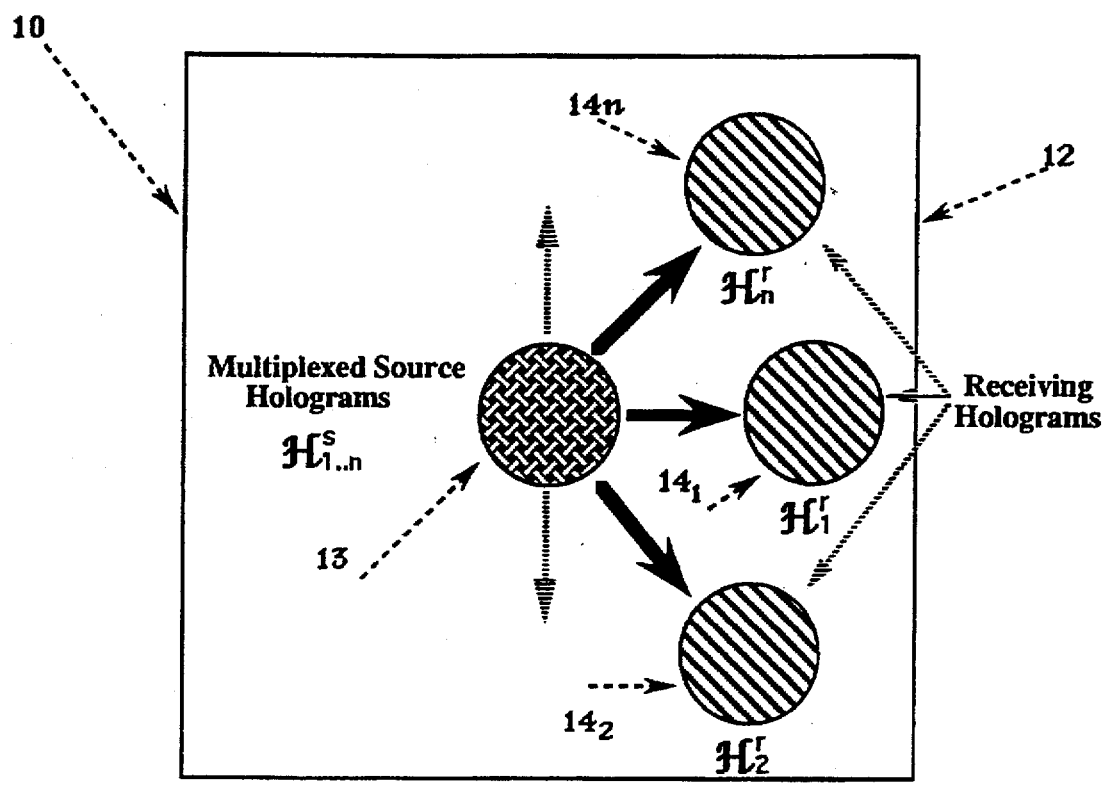
FIG. 3 is a top view diagrammatically illustrating the demultiplexing system of FIG. 2.

FIGS. 2 and 3 illustrate the basic building block of FIG. 1 constructed to provide a wavelength division demultiplexing system 10, including a holographic plate 12 linking a single source fiber 13 and a plurality of receiving fibers $14_1 \ldots 14_n$.

The source fiber 13 contains n different communication channels, $C_1 \ldots C_n$, with the wavelengths $\lambda_1 \ldots \lambda_n$, respectively. The central hologram is composed of n different HOEs, $\mathcal{H}_1^s \ldots \mathcal{H}_n^s$, which collimate the corresponding incoming channels, and diffract them into different directions. Each channel $C_i$ is then focused by its respective HOE, $\mathcal{H}_i^r$, onto its receiving fiber. It is evident that the propagation direction of the waves can be inverted to yield a system which multiplexes a number of channels from their separated source fibers onto one receiving fiber. Since the holographic plate can be located very close to the fibers, and the light waves are guided inside the holographic plate, the system can be very compact and easy to use. Furthermore, since the chromatic dispersion of $\mathcal{H}_i^s$ can be corrected for each channel by $\mathcal{H}_i^r$, the system is much less sensitive to source wavelength shifts.

In order to achieve high efficiency and negligible crosstalk between the channels, each $\mathcal{H}_i^s$ must have high diffraction efficiency for its respective wavelength $\lambda_i$, and very low efficiency for the other wavelengths $\lambda_j$, $j \neq i$. As it was shown before, each HOE can satisfy the Bragg condition for its appropriate wavelength, but to assure high diffraction efficiencies the relation $$\frac{2\eta_i D}{\lambda_i \sqrt{\cos\bar{\beta}_c \cos\bar{\beta}_{img}}} = 2m - 1, \tag{1}$$

also must be fulfilled, where $\eta_i$ is the refraction-index modulation, D is the emulsion thickness, $\bar{\beta}_c$ and $\bar{\beta}_{img}$ are the off-axis angles inside the emulsion of the reconstruction and the image waves respectively, and m is an integer number. Hence, for a given D, $\bar{\beta}_c$, and $\bar{\beta}_{img}$, the necessary refraction-index modulation to achieve high diffraction efficiency is $$\eta_i = \frac{(2m-1)\lambda_i \sqrt{\cos\bar{\beta}_c \cos\bar{\beta}_{img}}}{2D}. \tag{2}$$

Figure 4:
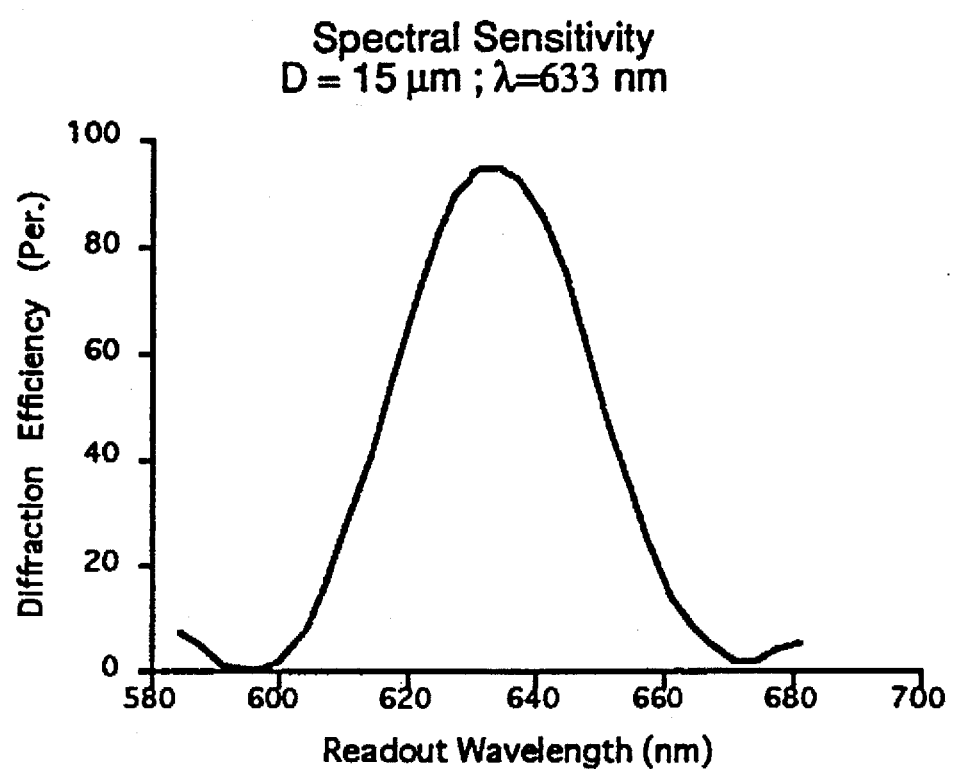
FIGS. 4, 5 and 6 are curves illustrating various relationships helpful in understanding the invention and its advantages, as will be described more particularly below.

To assure that the output wave will be trapped inside the plate by total internal reflection, $\bar{\beta}_{img}$ must satisfy the relation $$1 \geq \sin\bar{\beta}_{img} \geq 1/\nu \tag{3}$$

where $\nu$ is the refraction index of the plate. FIG. 4 shows the calculated wavelength sensitivity for a HOE recorded according to the following parameters:

$$D=15 \ \mu m, \ d_h=6 \ mm, \ d_f=24 \ mm, \ \nu=1.51, \ \eta_i=0.017 \ \lambda_i=633 \ nm, \ \bar{\beta}_c=0°, \ \bar{\beta}_{img}=45°, \tag{4}$$

where $d_h$ is the diameter of each hologram, and $d_f$ is the distance between the fibers and the hologram. It is apparent that for a small wavelength shift, up to ±5 nm, the efficiency is still above 90%, but for larger wavelength shifts it falls rapidly to zero. It has been shown before that the efficiency is zero when $\Delta\lambda_i$, the relative change in wavelength, is $$\frac{\Delta\lambda_i}{\lambda_i} = \pm \frac{\sqrt{3}}{2} \cdot \frac{\Lambda_i}{D\frac{\tan\bar{\beta}_{img}}{2}}, \tag{5}$$

where the grating period of $\mathcal{H}_i^s$ is $$\Lambda_i = \frac{\lambda_i}{2\nu\sin\frac{\bar{\beta}_{img}}{2}}. \tag{6}$$

Inserting Eq. (6) into Eq. (5) yields $$\Delta\lambda_i \approx \frac{\sqrt{3}}{2} \frac{\lambda_i^2}{D\nu\sin\frac{\bar{\beta}_{img}}{2}\tan\bar{\beta}_{img}}, \tag{7}$$

where we assume that $\bar{\beta}_c=0$ (i.e. the fibers are nodal to the hologram plane). Inserting Eq. (4) into Eq. (7) yields $\Delta\lambda_i=38$ nm, in accordance with FIG. 4. Equation (7) yields the desired channel spectral separation $\Delta\lambda_i$, which can be decreded by taking a thicker erosion layer or by increasing $\bar{\beta}_{img}$.

Another important parameter is the number of the channels that this WDM system can handle simultaneously. This number is actually the number of different HOEs which can be multiplexed together on the same substrate without reaching the refraction-index saturation of the recording material. Namely, the total sum of the desired refractive-index modulation $\eta_i$ for all the multiplexed channels must be less then the allowed maximum index modulation $\eta_{max}$ of the recording material. It has been shown before that for good recording materials like Dichromated Gelatin, when the relation $$\sum_{i=1}^{n} \eta_i \leq \eta_{max} \tag{8}$$

is fulfilled, a large number of holograms can be multiplexed together on the same substrate with high efficiencies, negligible absorption and with no index saturation. Inserting Eq. (8) into Eq. (2) yields the allowed maximum number of channels.

$$N_{chn} \approx \frac{\eta_{max}}{\eta_i} \approx \frac{2\eta_{max}D}{\lambda_{ave}\sqrt{\cos\bar{\beta}_{img}}}, \tag{9}$$

where $$m = 1 \text{ and } \lambda_{ave} = \frac{1}{n}\sum_{i=1}^{n}\lambda_i.$$

Figure 5:
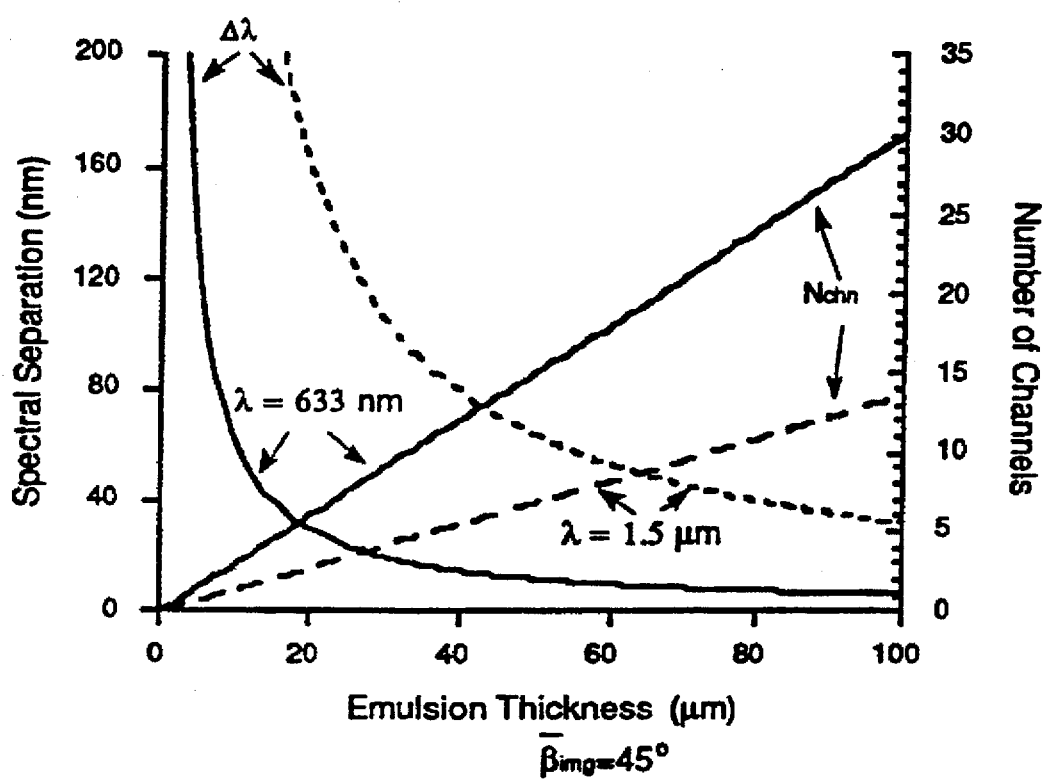
Figure 6:
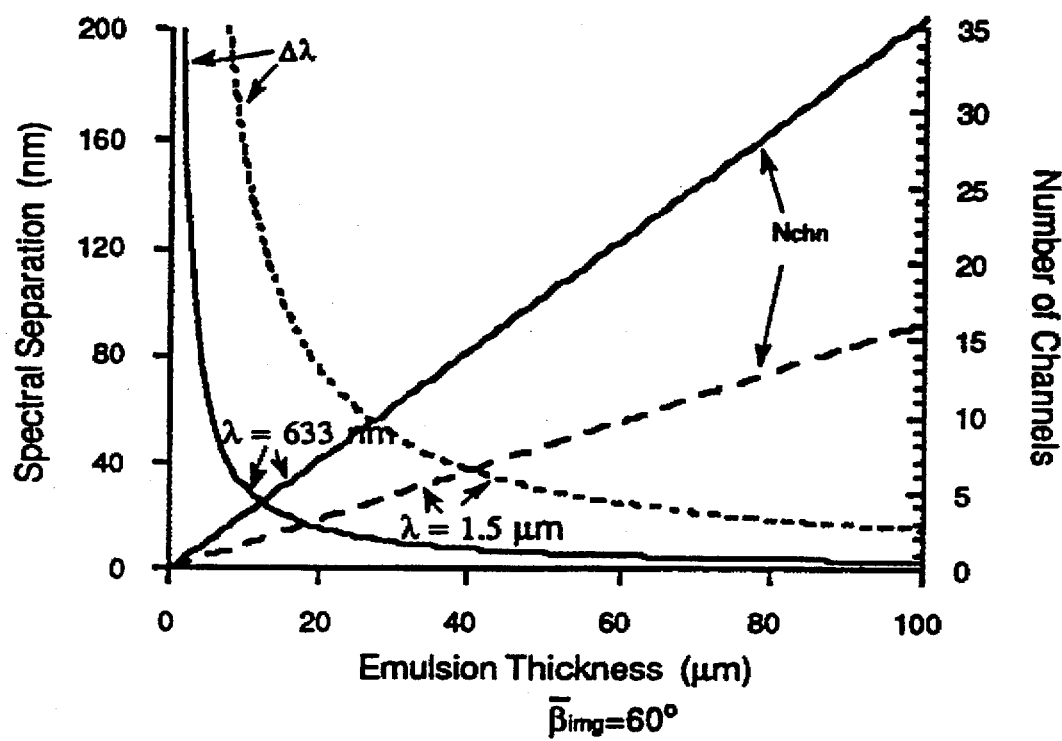

FIG. 5 shows the spectral separation and the number of channels as a function of D for $\lambda_{ave}=633$ nm (solid lines), and for $\lambda_{ave}=1.4$ μm (dashed line), where $\eta_{max}=0.08$ and $\bar{\beta}_{img}=45°$. The results reveal that a smaller spectral separation $\Delta\lambda_i$ and a larger number of channels $N_{chn}$ can be achieved by increasing D. A much thicker emulsion must be taken for $\lambda_{ave}=1.4$ μm in order to achieve the same performance as for $\lambda_{ave}=633$ nm. FIG. 6 shows the same calculations for $\bar{\beta}_{img}=60°$. The improvement in the performances for both wavelengths is apparent. For example, a substrate with emulsion thickness of D=40 μm and with $\bar{\beta}_{img}=60°$ can accommodate 15 channels with a small spectral separation of $\Delta\lambda_i \approx 7$ nm.

The design procedure is illustrated experimentally with a two-channel WDM system, where the recording material is Dichromated Gelatin with emulsion thickness of D=15 μm. The system has the same parameters as in Eq. (4) where $\lambda_1=633$ nm and $\lambda_2=595$ nm. The four HOEs: $\mathcal{H}_1^s$, $\mathcal{H}_2^s$ (which were multiplexed together), $\mathcal{H}_1^r$, and $\mathcal{H}_2^r$, were recorded according to the recursive procedure, where the recording wavelength was $\lambda_{rec}=458$ nm. It is apparent that $\mathcal{H}_1^s$ is identical to $\mathcal{H}_1^r$, only the reconstruction and the image waves are exchanged. Therefore, we need the same recording procedure for both holograms. Since the recording wavelength is different from the readout wavelength, the holographic elements must be recorded with pre-distorted wavefronts, in order to assure high diffraction efficiencies and low aberrations. The pre-distorted wavefronts are derived from interim holograms whose readout geometries differ from those used during recording. Specifically, the aberrated object and reference waves are derived from intermediate holograms, $\mathcal{H}_1^{obj}$ and $\mathcal{H}_1^{ref}$, respectively (the superscripts obj and ref also denote all the parameters that are related to $\mathcal{H}_1^{obj}$ and $\mathcal{H}_1^{ref}$, respectively).

We assume (to be proved below) that each multiplexed HOE, $\mathcal{H}_i^3$ (i=1,2), is very efficient for its respective wavelength $\lambda_i$ and actually transparent for the other. wavelength $\lambda_j$, j≠i. Hence, since each HOE is acting only on a single wavelength, we may use the design procedure which is described in details in Y. Amitai and J. W. Goodman, Appl. Opt. 30,(1991) 2376. According to this design the relations that describe the relevant parameters of the interim holograms to yield high efficiencies and diffraction limited imaging are $$\sin\beta_r^{obj} = -(a + \Delta_{v,\mu,\beta_i})\sin\beta_{img}, \quad (10)$$

$$\sin\beta_r^{ref} = -(b + \Delta_{v,\mu,\beta_i})\sin\beta_{img},$$

$$\frac{1}{R_o^{obj}} + \frac{1}{R_c^{obj}} = (b + \Delta_{v,\mu,\beta_i})\frac{1}{d_f},$$

$$\frac{1}{R_o^{ref}} + \frac{1}{R_c^{ref}} = (a + \Delta_{v,\mu,\beta_i})\frac{1}{d_f},$$

$$\frac{1}{R_c^3} + \mu\left(\frac{1}{(R_o^{obj})^3} + \frac{1}{(R_c^{obj})^3} - \frac{1}{(R_o^{ref})^3} - \frac{1}{(R_c^{ref})^3}\right) = 0,$$

$$\frac{1}{R_c^5} + \mu\left(\frac{1}{(R_o^{obj})^5} + \frac{1}{(R_c^{obj})^5} - \frac{1}{(R_o^{ref})^5} - \frac{1}{(R_c^{ref})^5}\right) = 0,$$

$$\beta_o^{obj} = \beta_c^{obj} = \beta_o^{ref} = \beta_c^{ref} = 0$$

$$R_r^{obj} = R_r^{ref} = \infty$$

where c, o, and r are the indices of the reconstruction, object and reference wave, respectively, $R_q$(q=c, o, r) is the distance between the respective point source and the center of the hologram, $\beta_q$ is the respective off-axis angle outside the holographic plate, and $\mu$, a, b, $\beta_{img}$, and $\Delta_{v,\mu,\beta_i}$ are defined as $$\mu \equiv \frac{\lambda_c}{\lambda_o}, a \equiv \frac{\mu+1}{2\mu}, b \equiv \frac{\mu-1}{2\mu} \quad (11)$$

$$\sin\beta_{img} \equiv v\sin\overline{\beta}_{img}, \Delta_{v,\mu,\beta_i} \equiv \frac{\mu^2-1}{16v^2\mu^2}\sin^2\beta_{img} + \frac{\sin^4\beta_{img}}{32v^4}.$$

Inserting the values from Eq. (4) into Eq. (10), and setting $\mu$=633/458=1.38, yields the following parameters for $\mathcal{H}_1^{obj}$ and $\mathcal{H}_1^{ref}$, $$R_o^{obj}=-33.3 \text{ mm}, \beta_r^{obj}=-69.75°, R_c^{obj}=27.2 \text{ mm}, R_o^{ref}=-188.3 \text{ mm}, \beta_r^{ref}=-9.83°, R_c^{ref}=23.7 \text{ mm}. \quad (12)$$

We repeated the sine procedure for recording $\mathcal{H}_2^s$ and $\mathcal{H}_2^r$ with the interim holograms $\mathcal{H}_2^{obj}$ and $\mathcal{H}_2^{ref}$, where we set now $\mu$=595/458=1.30. The relevant parameters for $\mathcal{H}_2^{obj}$ and $\mathcal{H}_2^{ref}$ are now $$R_o^{obj}=-32.4 \text{ mm}, \beta_r^{obj}=-73.79°, R_c^{obj}=27.4 \text{ mm}, R_o^{ref}=-224.4 \text{ mm}, \beta_r^{ref}=-8.28°, R_c^{ref}=23.7 \text{ mm} \quad (13)$$

FIG. 7 illustrates the efficiencies of the various HOEs for $\lambda_1$ and $\lambda_2$. It is apparent that each HOE is efficient for its respective wavelength and essentially transparent to the second wavelength. The total diffraction efficiency of both channels is more than 50%, and the cross-talk between the channels, taking into account also the de-focusing and the lateral shift, is practically zero. We also measured the spot sizes of the two waves, $\lambda_1$ and $\lambda_2$, which were focused by $\mathcal{H}_1^r$ and $\mathcal{H}_2^r$ respectively. Both spot sizes were measured to be ≈7 μm, which is nearly a diffraction limited performance.

Although the experimental results were demonstrated for a system with two channels and moderate spectral separation, the procedure can readily be extended, according to the theoretical results in the previous section, to fabricate WDM systems with large numbers of channels and much smaller spectral separation.

Figure 8:
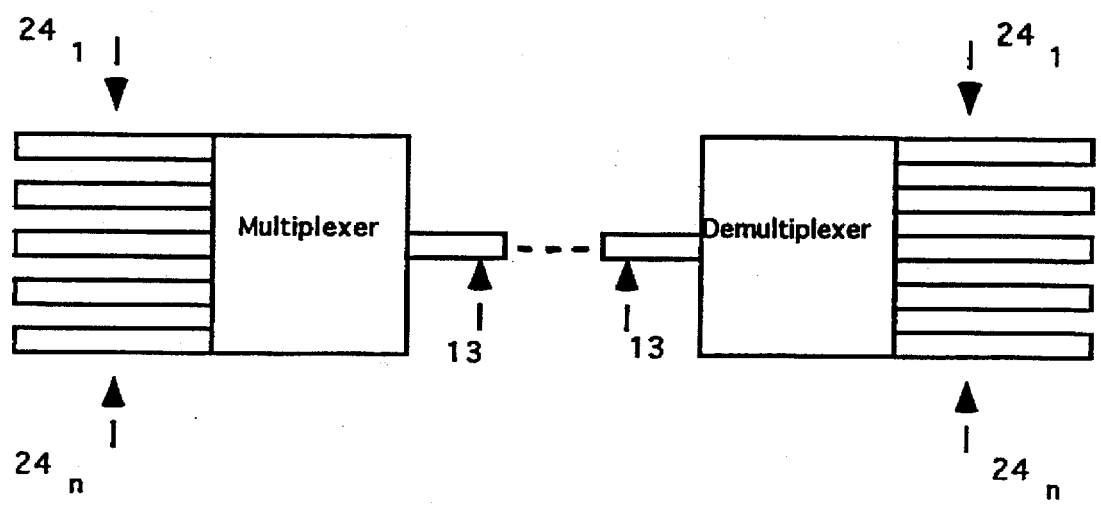
FIG. 8 diagrammatically illustrates a demultiplexer system according to FIGS. 2 and 3 included in combination with a corresponding multiplexer system.
Figure 9:
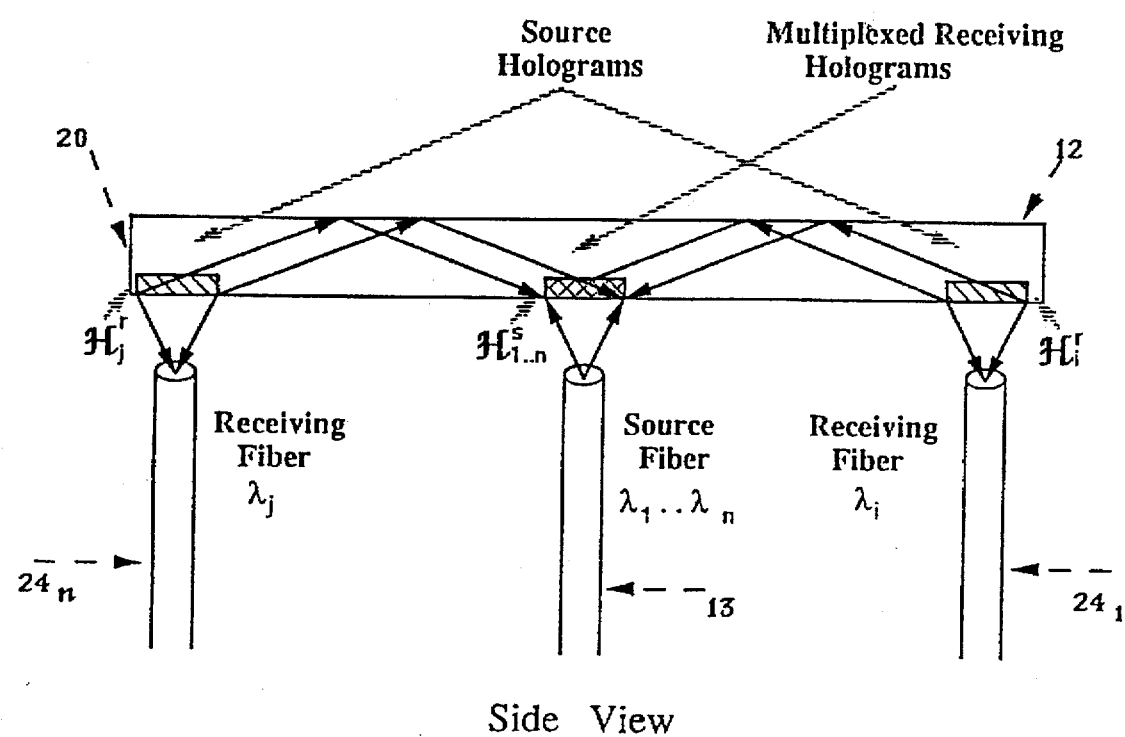
FIGS. 9 and 10 are views corresponding to FIGS. 2 and 3, respectively, but of the multiplexer system of FIG. 8.
Figure 10:
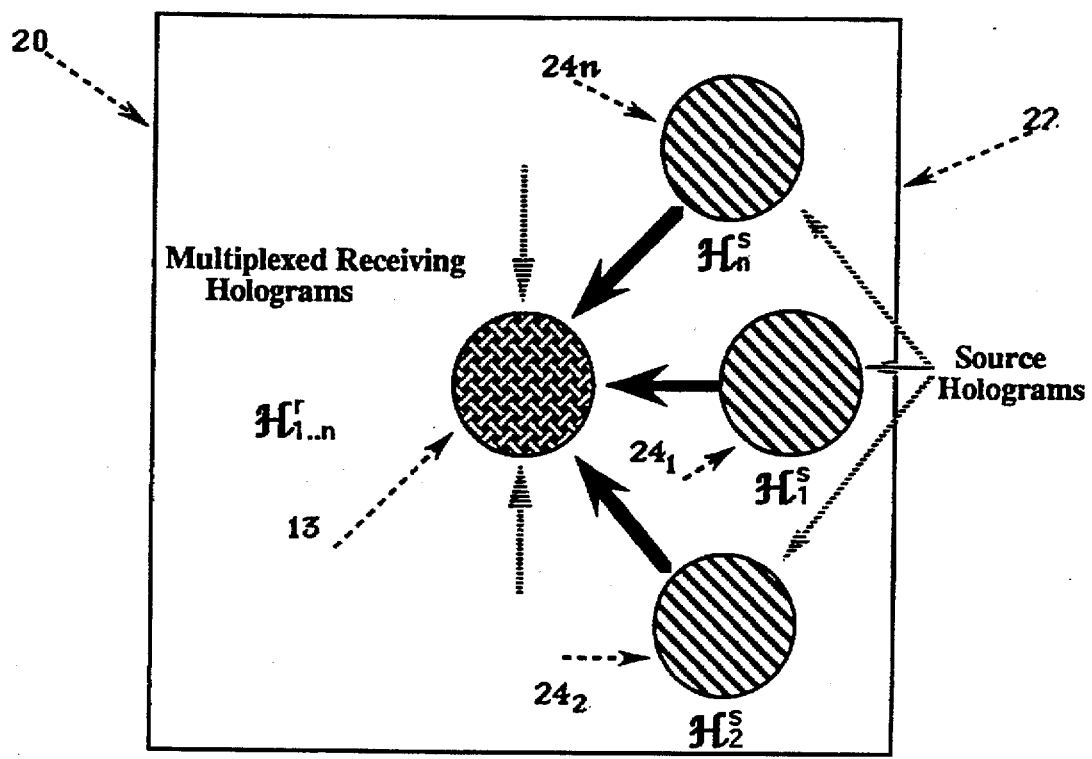

The Multiplexer/Demultiplexer System of FIGS. 8–10

FIG. 8 diagrammatically illustrates a demultiplexer 10 including a source fiber 13 and a plurality of receiving fibers $14_1 \ldots 14_n$, as described above, incorporated into a complete multiplexer/demultiplexer system. Such a system includes a multiplexer 20 designated 20 which receives the optical signals from a plurality of channels of different wavelengths, as supplied by a plurality of source fibers $21_1 \ldots 21_n$, and multiplexes the optical signals onto the single fiber 13 serving as an intermediate transmission fiber. Demultiplexer 10 demultiplexes all the optical signals on the intermediate fiber 13 back to their respective optical fibers.

Multiplexer 20 in FIG. 8 is more particularly illustrated in FIGS. 9 and 10, wherein it will be seen that it corresponds to the illustrations in FIG. 2 and 3 but with an inverted propagation direction of the waves to produce a multiplexing operation of a plurality of separate channels to a single channel, rather that a demultiplexing operation of a single channel to a plurality of separate channels.

Compact Holographic Three-Dimensional Display (FIGS. 11–15)

Figure 11:
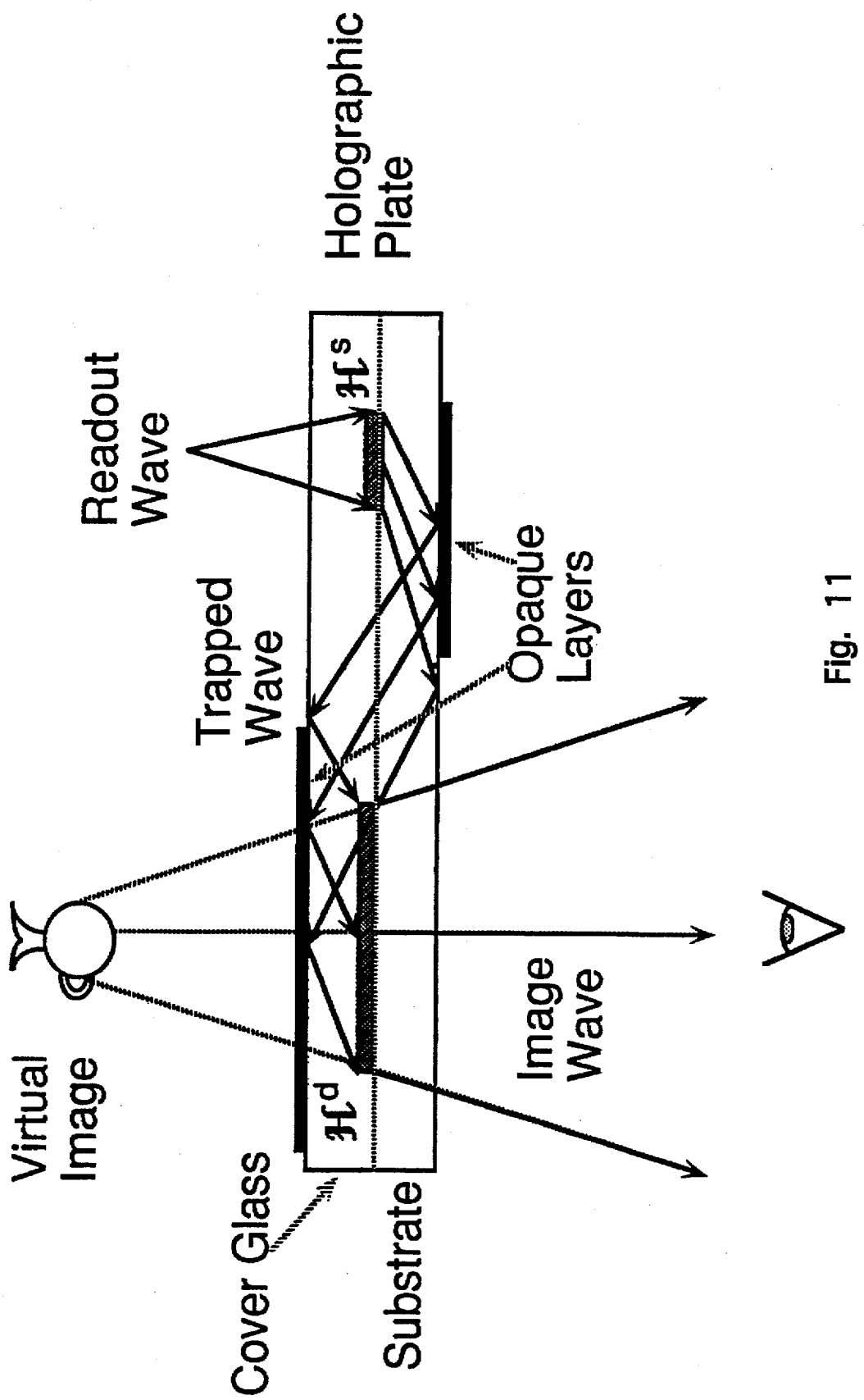
FIG. 11 diagrammatically illustrates one holographic optical device constructed in accordance with the present invention particularly useful as a compact holographic three-dimensional display.

FIG. 11 illustrates a compact holographic three-dimensional display constructed in accordance with the present invention. The illustrated device is composed of a source hologram and a display hologram, indicated, respectively, $\mathcal{H}^s$ and $\mathcal{H}^d$ (the superscripts s and d also denote all the parameters that are related to $\mathcal{H}^s$ and $\mathcal{H}^d$, respectively). The readout wave for the final hologram is a spherical wave at a distance $R_c^s$ from the center of the hologram and at an off-axis angle $\beta_c$. The image wave is a diverging beam at an angle $\overline{\beta}_i^s$ inside the plate. To assure that the image wave will be trapped inside the plate by total internal reflection, $\overline{\beta}_i^s$ must satisfy the relation $$v \leq \sin\beta_i^s(x) = v\overline{\beta}_i^s(x) \geq 1; \text{ for all } x, \quad (14)$$

where x is the lateral coordinate of $\mathcal{H}^s$ and v is the refractive index of the substrate and the glass cover plates. The second element $\mathcal{H}_d$ couples the image wave of $\mathcal{H}^s$ to the exterior so as to form a virtual image of a three-dimensional object. To avoid extraneous light from the zero order or from undesired reflections, parts of the surfaces should be covered with opaque layers.

As is already known, the conditions for recording an efficient transmission HOE with two spherical waves for predetermined values of $R_i$, $R_c$, $\beta_i$, $\beta_c$, and $\mu \neq 1$ are given by $$\frac{1}{R_o} = a\frac{1}{R_i} + b\frac{1}{R_c}, \quad \sin\beta_o = a\sin\beta_i + b\sin\beta_c, \quad (15)$$

$$\frac{1}{R_r} = a\frac{1}{R_c} + b\frac{1}{R_i}, \quad \sin\beta_r = a\sin\beta_c + b\sin\beta_i,$$

where i, c, o, and r are the indices of the image, reconstruction, object and reference wave, respectively, $R_q$ (q=i, c, o, r) are the distances between the respective point source and the center of the hologram, $\beta_q$ are the respective off-axis angles, $\mu$ is the ratio between the readout and the recording wavelengths, i.e. $\mu=\lambda_c/\lambda_o$, and a and b are defined as $$a \equiv \frac{\mu+1}{2\mu} + \Delta_{\nu,\mu,\beta_i}, \quad b \equiv \frac{\mu-1}{2\mu} + \Delta_{\nu,\mu,\beta_i} \quad (16)$$

$\Delta_{\nu,\mu,\beta_i}$ is defined as $$\Delta_{\nu,\mu,\beta_i} \equiv \frac{\mu^2-1}{16\nu^2\mu^2}\sin^2\beta_{img} + \frac{\sin^4\beta_{img}}{32\nu^4}. \quad (16)$$

Denoting with a bar the parameters inside the plate and using Snell's law, yields $$\sin\beta_q = \nu\sin\bar\beta_q; \quad \frac{1}{R_q} = \nu\frac{1}{\bar R_q} \quad (q=i,c,o,r). \quad (17)$$

Inserting Eq. (17) into Eq. (16), yields the desired recording parameters or $\mathcal{H}^s$, as $$\frac{1}{\bar R_o^s} = a\nu\frac{1}{\bar R_i^s} + b\frac{1}{\bar R_c^s}, \quad \sin\bar\beta_o^s = a\nu\sin\bar\beta_i^s + b\sin\bar\beta_c^s, \quad (18)$$

$$\frac{1}{\bar R_r^s} = a\frac{1}{\bar R_c^s} + b\nu\frac{1}{\bar R_i^s}, \quad \sin\bar\beta_r^s = a\sin\bar\beta_c^s + b\nu\sin\bar\beta_i^s,$$

Figure 12:
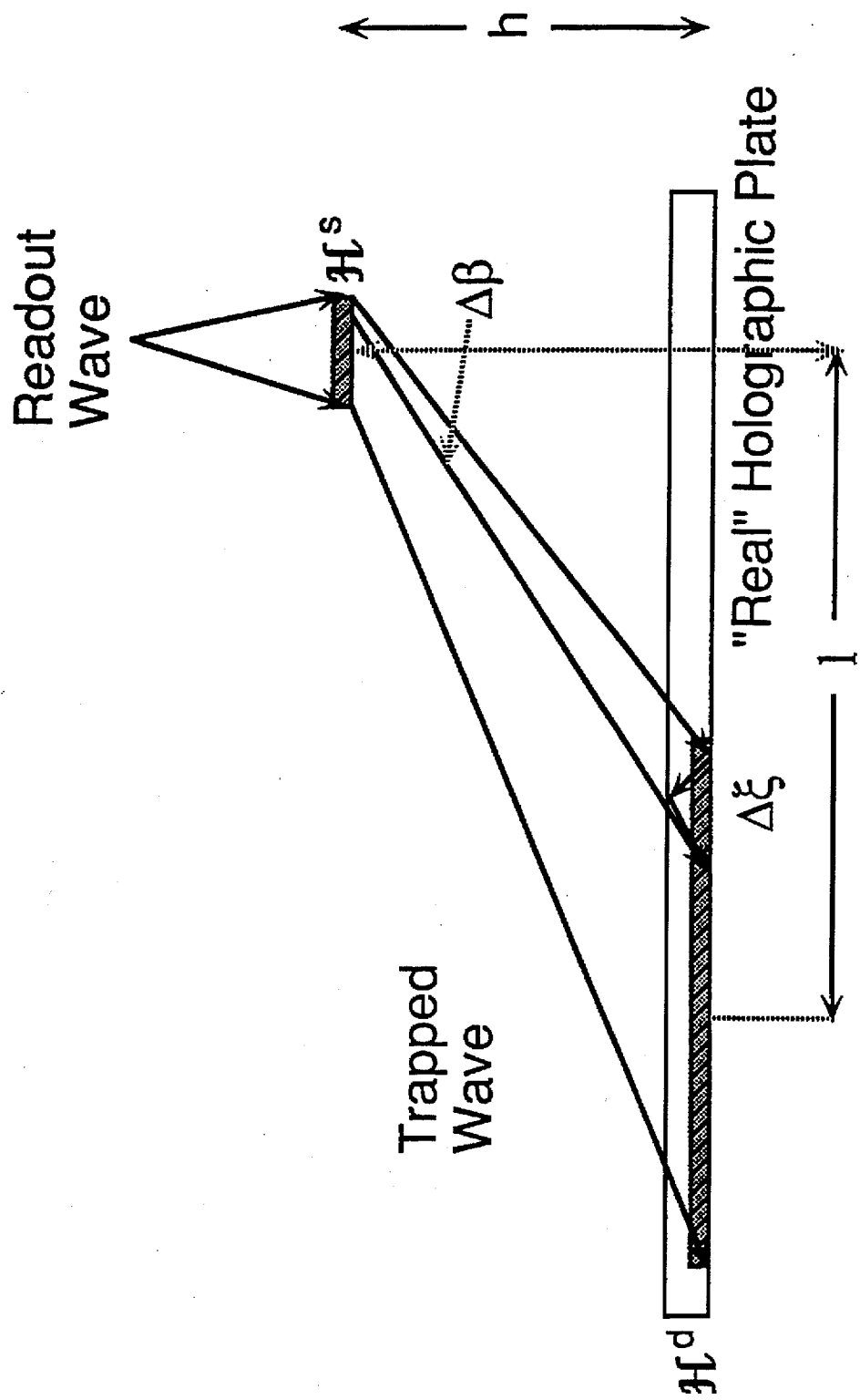
FIG. 12 illustrates an unfolded configuration of the device of FIG. 1.

For convenience we now exploit the unfolded DHD configuration shown in FIG. 12. Here the readout parameters for $\mathcal{H}_d$ are given by $$\sin\bar\beta_c^d = \sin\bar\beta_i^s; \quad \bar R_c^d = \bar R_i^s + \frac{l}{\sin\bar\beta_i^s}, \quad (19)$$

where l is the distance between the center of the two holograms. To achieve high diffraction efficiency also for $\mathcal{H}^d$, it is recorded with a spherical reference wave and with a light which is scattered from a three-dimensional object whose geometrical parameters are given by $$\frac{1}{\bar R_o^d} = a\frac{1}{\bar R_i^d} + b\nu\frac{1}{\bar R_c^d}, \quad \sin\bar\beta_o^d = a\sin\bar\beta_i^d + b\nu\sin\bar\beta_c^d, \quad (20)$$

$$\frac{1}{\bar R_r^d} = a\nu\frac{1}{\bar R_c^d} + b\frac{1}{\bar R_i^d}, \quad \sin\bar\beta_r^d = a\nu\sin\bar\beta_c^d + b\sin\bar\beta_i^d,$$

It must be noted that as each ray from $\mathcal{H}^s$ undergoes several bounces inside the holographic plate, and impinges on the surface of $\mathcal{H}^d$ at several locations. Thus, we must ensure that diffraction occurs only at the desired locations, in order to avoid extraneous diffraction and thereby the formation of ghost images. To achieve this, $\bar\beta_i^s(x)$ must satisfy the Bragg condition only in the coordinate $\xi(x)$, where $$\xi(x) = x + \frac{l\tan\bar\beta_i^s(x)}{\cot\bar\beta_i^s(0)}.$$

After each bounce, the ray having the angle $\bar\beta_i^s f(x) = \bar\beta_c^d(\xi)$, passes a lateral distance of $$\Delta\xi = 2D\tan\bar\beta_c^d(\xi), \quad (21)$$

where D is the thickness of the holographic plate. Hence, the angular distance between $\bar\beta_c^d(\xi)$ and the Bragg angle of $\xi+\Delta\xi$ is $$\Delta\bar\beta_c^d(\xi) = \bar\beta_c^d(\xi+d\xi) - \bar\beta_c^d(\xi) \simeq \frac{\Delta\xi}{\bar R_c^d \cos\bar\beta_c^d(\xi)} = \frac{2D\tan\bar\beta_c^d(\xi)}{h}, \quad (22)$$

where $h \equiv \bar R_c^d(\xi)\cos\bar\beta_c^d(\xi)=l\cot\bar\beta_c^d(0)$ is a constant. Now, the diffraction efficiency is zero when $\Delta\beta^{Bragg}(\xi)$, the relative change between $\bar\beta_c^d(\xi)$ and the Bragg angle, is $$\Delta\bar\beta^{Bragg}(\xi) = \frac{\sqrt{3}}{2}\frac{\lambda_c}{\nu\sin\left(\frac{\bar\beta_c^d(\xi)}{2}\right)\tan\bar\beta_c^d(\xi)T}, \quad (23)$$

where T is the emulsion thickness. Hence, to avoid undesired diffraction the condition $$\Delta\bar\beta^{Bragg}(\xi) < \Delta\bar\beta_c^d(\xi) \quad (24)$$

must be fulfilled. Substituting Eqs. (22) and (23) into Eq. (24), yields the following condition of $$D > \frac{\sqrt{3}}{4}\frac{\lambda_c l}{\nu\sin\left(\frac{\bar\beta_{c_{min}}^d}{2}\right)\tan^2\bar\beta_{c_{min}}^d T}, \quad (25)$$

where $\bar\beta_{c_{min}}^d$ is the minimal bouncing angle of rays inside the plate.

The design method is illustrated experimentally with a DHD having the parameters $\bar\beta_i^s=48°$, $\bar\beta=_c^s=\bar\beta_i^d=-10°$, $R_i^s=R_i^s=30$ mm, $R_i^d=200$ mm $\lambda_o=488$ nm, $\lambda_c=633$ nm, l=55 mm, T=7 μm $D^s=1$ cm, $D^d=3$ cm, and $\nu=1.51$, (26)

where $D^s$ and $D^d$ are the diameter of $\mathcal{H}_s$ and $\mathcal{H}^d$, respectively. Inserting the parameter values given in Eq. (26) into Eqs. (18) and (20) yields the recording parameters for $\mathcal{H}^s$ and $\mathcal{H}^d$ as $R_o^s=28.4$ mm, $\beta_o^s=79.9°$, $R_r^s=28.4$ mm, $\beta_o^s=-4.6°$, $R_o^d=153.6$ mm, $\beta_o^d=-4.6°$, $R_r^d=72.6$ mm, $\beta_r^d=79.9°$, (27)

Inserting the parameter values of Eq. (26) into Eq. (25) yields the condition for the thickness of the holographic plate, as $$D > 3 \text{ mm}. \quad (28)$$

The holograms were recorded on a photographic Agfa-8E56 plate and were bleached during the developing process to achieve high efficiencies. This plate was coated with a protective cover glass to yield a total holographic plate thickness of D=4.5 mm; hence, the condition in Eq. (28) has been fulfilled.

Figure 13:
FIGS. 13–15 are photographic prints illustrating results produced by holographic optical devices constructed according to FIG. 11.

FIG. 13 shows the virtual image that could be observed when the holographic plate was reconstructed with a HeNe source, in which case a sharp and efficient image was reconstructed. To illustrate also the spectral selectivity of the DHD, it was reconstructed with a white light source. Since, usually, planar optics holograms are very discriminating to readout wavelength, only a relatively narrow bandwidth of the source was diffracted by $\mathcal{H}^s$ and trapped inside the plate; in this case it was reddish reconstruction. With such narrow bandwidth, the chromatic dispersion of $\mathcal{H}^s$ was compensated almost completely by $\mathcal{H}^d$ to yield a sharp image.

Figure 15:
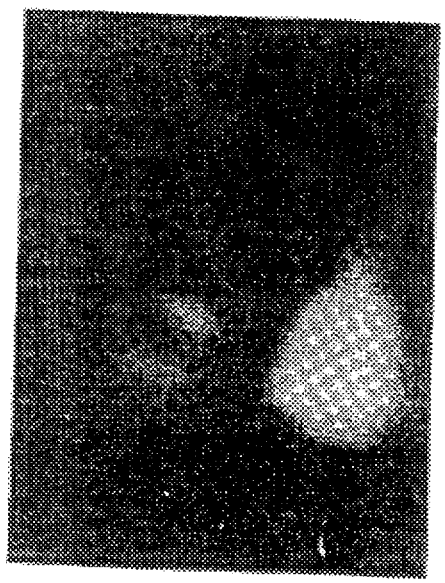
Figure 14:
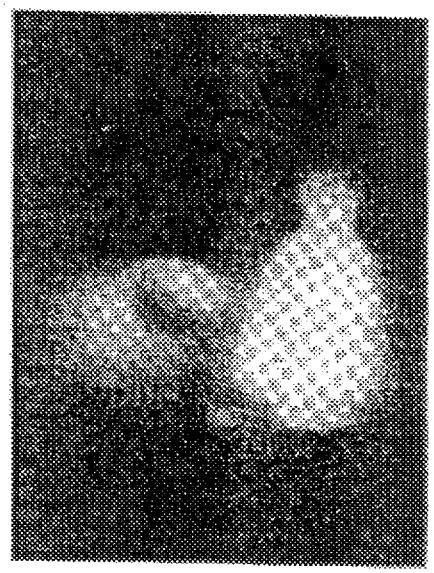

FIGS. 14 and 15 show the images which were formed when the holographic optical device of FIG. 11 was illuminated by a white light source from two different viewing points, to illustrate the three-dimensionality of the reconstructed image.

It will be appreciated that since the holographic plate can be located very close to the light source, and the light is guided inside the plate, the holographic three-dimensional display can be very compact and easy to use. Furthermore, since the chromatic dispersion of the first hologram can be corrected by the dispersion of the second hologram, this display is much less sensitive to the source wavelength.

Compact Holographic Beam Expander (or Compressor) (FIGS. 16–21)

When the novel holographic optical device is embodied as a compact beam expander (or compressor), both of the holographic optical elements on the light-submissive substrate are holographic lenses, and are constructed such that the lateral dimensions of the light beam emerging from the substrate from the second holographic lens involve a magnification (in the case of a beam expander), or de-magnification (in the case of a beam compressor) of the lateral dimensions of the light beam entering the substrate to the first holographic lens.

Figure 16:
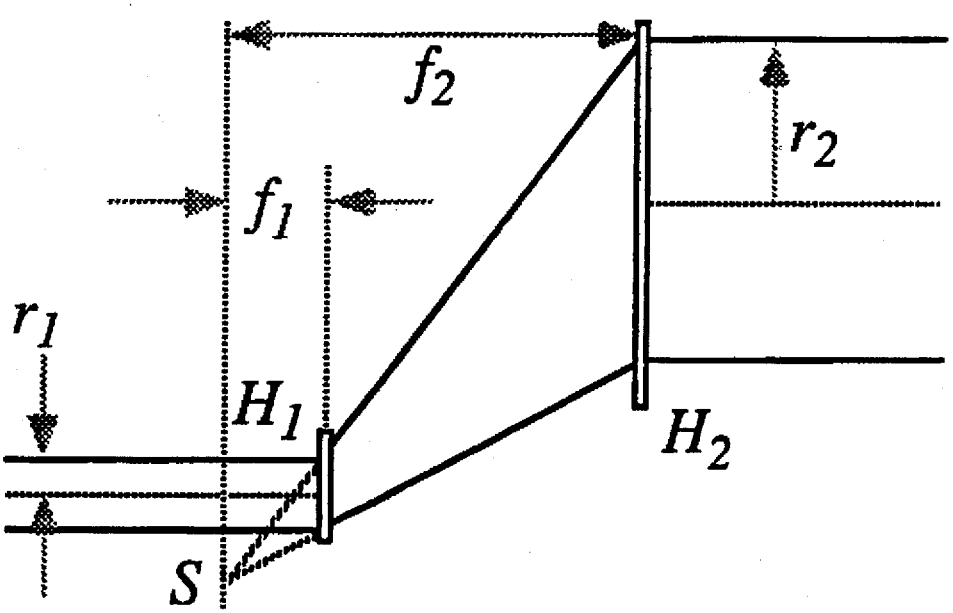
FIG. 16 is a diagram illustrating the basic configuration of a holographic beam expander (or compressor) constructed in accordance with the present invention.

A basic configurations of a beam expander is shown in FIG. 16. A narrow beam of radius $r_1$ impinges normally on lens $H_1$, which, in turn, diffracts light to an off-axis spherical wave. The diffracted light then propagates towards a collimating lens $H_2$, to obtain an output beam of radius $r_2$. This configuration can be folded with planar optics by exploiting total internal reflection. Here, the two lenses are recorded side by side on one plate. When the diffraction angles are sufficiently large, the diffracted spherical wave will be trapped within the plate on which the lenses are recorded. The rays from $H_1$ will continuously be reflected until they are diffracted outward by $H_2$. In order to ensure that any undesired interactions between any internally reflected rays and the holographic lenses are minimized, certain geometrical and diffraction efficiency considerations must be imposed. These involve proper choice of thickness and phase modulation for the recording material, of thickness for the glass plate thickness and of diameters for the holographic lenses.

Figure 17:
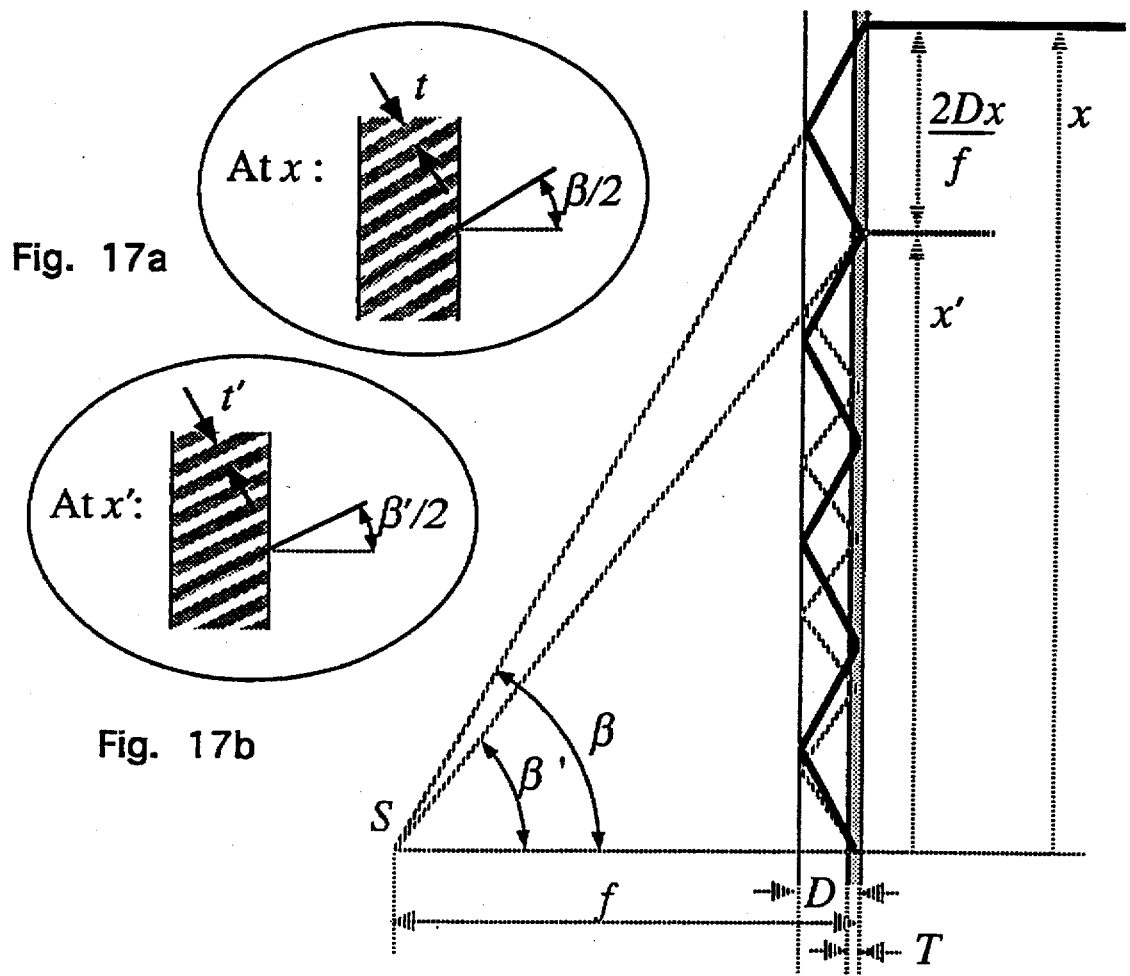
FIG. 17 illustrates the geometry of a planar holographic lens and associated rays.
Figure 18:
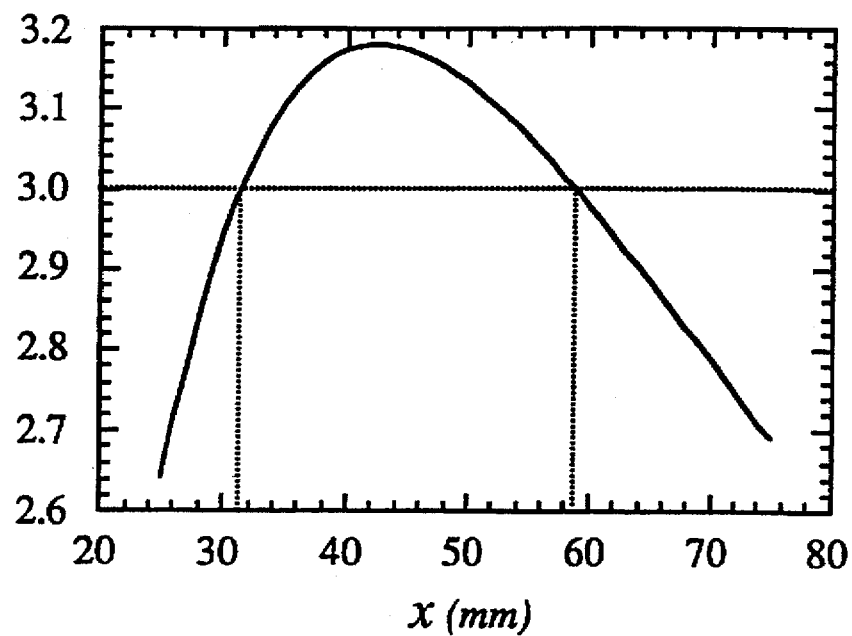
FIG. 18 is a curve illustrating the angular sensitivity of the planar holographic lens of FIG. 17.
Figure 19:
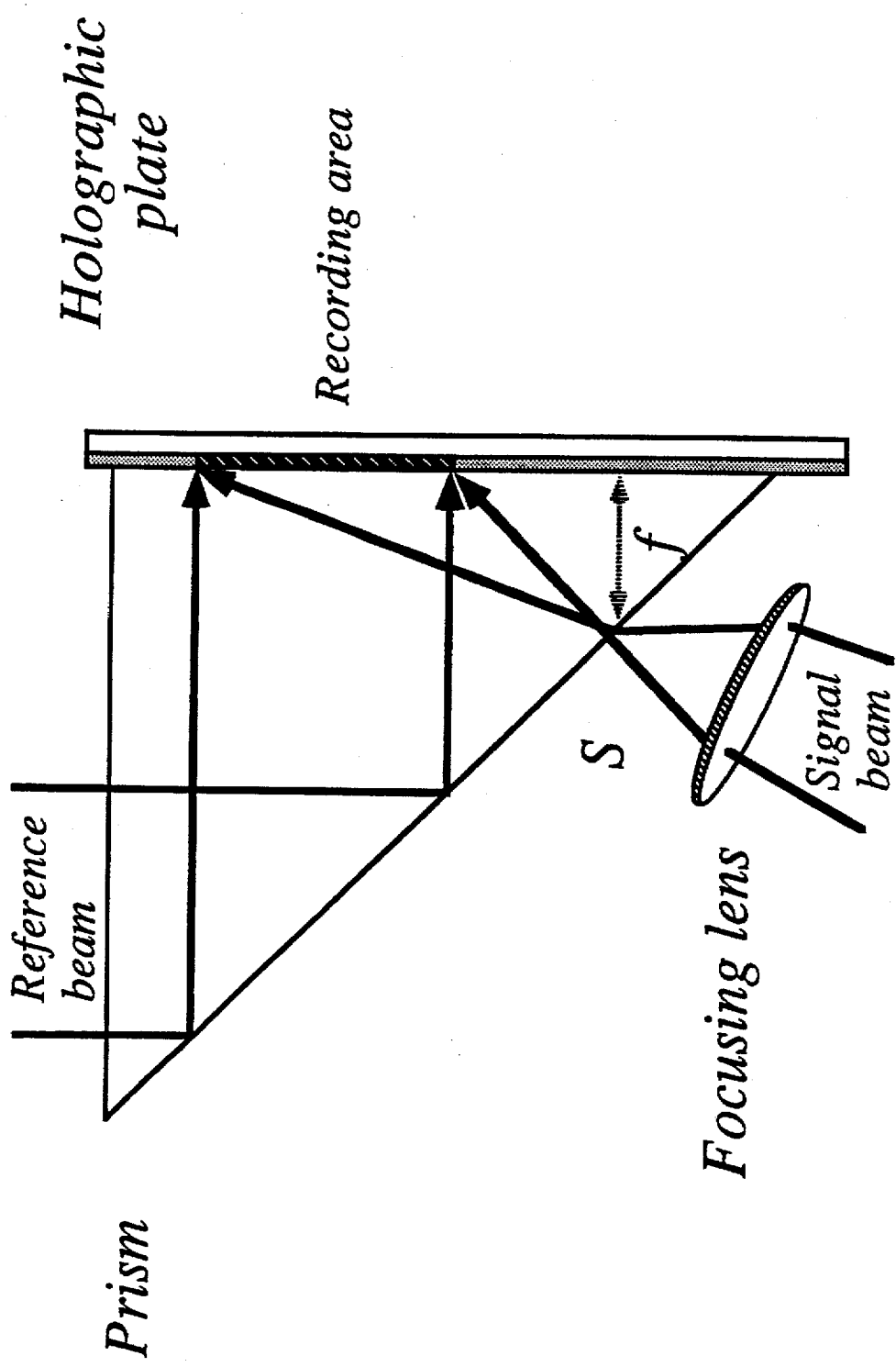
FIG. 19 illustrates an arrangement for recording a planar holographic lens.

The geometry for one holographic lens and the relevant rays is shown in FIG. 17. It depicts a thick phase diffraction grating that is designed to diffract all normally incident rays towards a common focal point S at a distance f from the plate, or, alternatively, to diffract the rays emanating from the common point S so as to obtain a plane wave. The thicknesses of the grating and the glass plate are T and D, respectively. Also shown are magnified portions of the grating structure, where t and t' are the local distances between adjacent fringes at x and at x', respectively. Consider an incident ray (upper solid curve) that is diffracted at x by an angle $\beta$. Due to the glass-air interface at the back plane of the plate, this ray cannot reach the point S as illustrated by the dotted fine. Specifically, when $\beta$ is larger than the critical angle, the diffracted ray will undergo total internal reflections at the glass-air and emulsion-air interfaces. After the first reflection from the emulsion-air interface, at x' (and after subsequent reflections as well), the reflected ray may interact again with the grating, leading to undesired diffraction and loss. These can be minimized by exploiting the fact that with thick gratings, efficient diffraction occurs only at, or near, the Bragg angle, which, in turn, differs from one location on the grating to another. Specifically, we must ensure that the reflection angle of the ray which is internally reflected at x' (i.e. the angle $\beta$), sufficiently differs from the Bragg angle $\beta$ at this location. This is achieved when $\beta - \beta'$ is greater than the Bragg angular discrimination interval of the grating, $\Delta\beta'_B$; this is essentially the interval beyond which no significant diffraction occurs.

In order to determine whether there is a region on the holographic lens for which $\beta - \beta'$ is indeed sufficiently greater than the angular discrimination interval $\Delta\beta'_B$, we used Eqs. (9) and (10) to calculated the ratio of $(\beta - \beta')/\Delta\beta'_B$ as a function of x. The results are shown in FIG. 8. They were calculated using the parameters $\lambda = 0.514$ μm, $\nu = 1.51$, $T = 20$ μm, $D = 1.5$ mm and $d = 25$ mm. As evident, there is a section between $x = 31$ mm and $x = 59$ mm, where $\beta - \beta'$ is more than 3 times larger than $\Delta\beta'_B$. These results imply that for such a planar holographic lens, the diffraction at x' of any ray that is incident on the plate at x within this section, is negligible. At the next interaction site of this ray with the grating, namely at $x'' = x(1 - 4l/f)$, and at the interaction sites that follow, the ratio between the off-Bragg angle and the angular discrimination interval is even larger, thus, although each ray impinges on the grating at several sites, significant diffraction occurs only at the desired incidence site. These results are also valid for the reversed situation, in which all beam directions are inverted. In this case, a diverging spherical wave propagates within the plate, and emerges from the plate as a plane wave. Each ray of the spherical wave interacts with the hologram at several locations, which are 2Tx/f apart, but is diffracted only at the desired location x, where it emerges from the plate perpendicularly. The parameters above were therefore used for the lens $H_2$ in our telescopic configuration. It should be noted that for this lens, the zero diffraction order remains napped within the plate, and can be absorbed at its edge.

Two non overlapping holographic lenses were recorded on the same plate, in order to obtain a folded version of the telescopic beam expander configuration of FIG. 17. The recording arrangement is shown schematically in FIG. 19. A Large glass right angle prism, index matched to the holographic plate, introduces the spherical wave into the recording medium at angles above the critical angle so as to get total internal reflection. The spherical wave, derived from an argon laser ($\lambda = 0.514$ μm), is focused on the face of the prism; this way the spherical shape of the phase front is unaffected by refraction. A plane wave, derived from the same laser, undergoes a 90 degrees total internal reflection inside the prism so it will be perpendicularly incident on the recording medium. The interference pattern between the two waves is recorded, to form the desired holographic lens. Finally, to record a second, laterally displaced, lens on the same plate, the spherical wave, the plane wave and the plate are shifted with respect to the prism, so that the spherical wave and the plane wave interfere at a different region on the plate. The shift distances are such that the focal points of the two holographic lenses coincide. The two lenses were recorded in a 20 μm thick layer of experimental polymeric material from Dupont, which was coated on a 1.5 mm thick glass plate with refractive index of 1.51. In our experiment, the glass plate was a commercial photographic plate from which the emulsion was removed. The focal distances for the larger and the smaller holographic lenses were 25 mm and 7 mm, respectively; hence the overall magnification is about 3.5. $H_2$ was recorded between x=34 mm and x=56 mm, which is, according to FIG. 18, within the optimal recording region. For $H_1$, which was recorded between x=10 mm and x=16 mm, the ratio between the lens diameter and the plate thickness D is smaller than for $H_2$, thus it does not cause any spurious diffractions.

Figure 20:
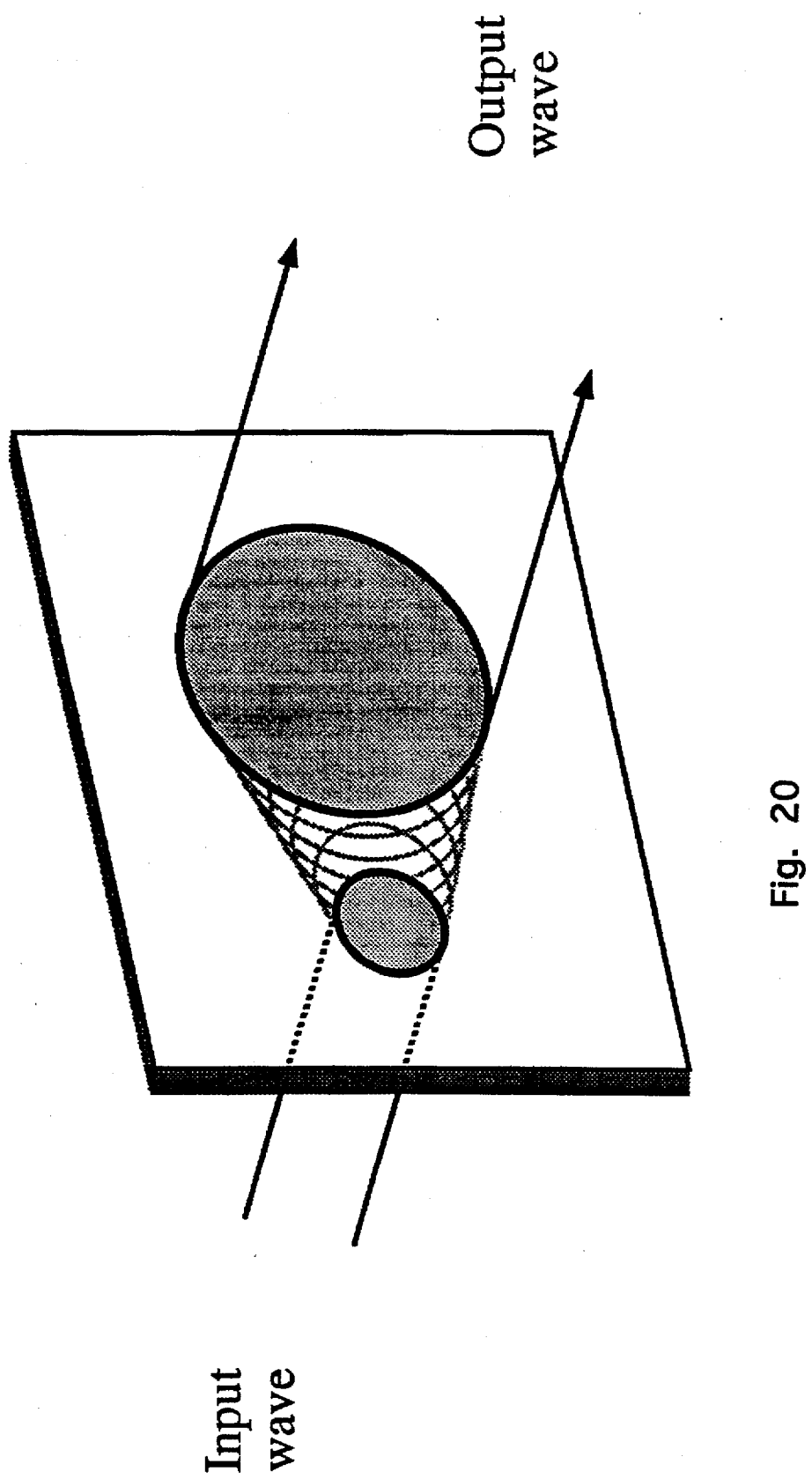
FIG. 20 illustrates the beam magnification produced by the holographic beam expander of FIG. 16.
Figure 21:
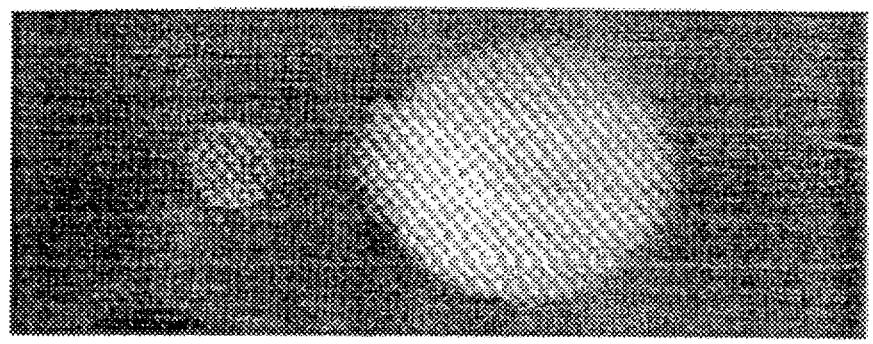
FIG. 21 is a photographic print illustrating experimental results obtained with a beam expander constructed in accordance with FIG. 16.

After recording the two laterally displaced lenses on one plate, we tested our compact configuration, as illustrated in FIG. 20. A narrow plane wave was incident perpendicularly on the smaller lens, and an expanded plane wave emerged from the larger lens. FIG. 21 shows the corresponding experimental results. It is a photograph of cross sections of two laterally displaced plane waves. The larger one represents the output beam, whereas the smaller one represents the undiffracted part of the incident input beam. The photograph was taken on axis at a distance of 200 mm from the plate. The haze around the output beam is mainly due to scattering from the recording medium. The diameter of the input beam was 6 ram, whereas the diameter of the output beam was measured to be 21 mm, confirming the predicted magnification of 3.5. The difference of 18 mm between the focal lengths of the two lenses is 12 times larger than the thickness of the plate; this implies that the diverging spherical wave undergoes 12 reflections within the plate.

There are two major factors that could limit the performance of the compact expander. First, non-flatness of the glass plate could readily lead to phase non-uniformities across the output wave front, since the spherical wave undergoes numerous (in our case, 12) reflections within the plate;. Second, excessive absorption and scattering in the glass and in the recording material can reduce the efficiency of planar expanders, especially those where the light navels a considerable distance within the plate. In our experimental expander, where the rays travel through 33 mm to 44 mm of glass and where the glass plate is not of high quality, the overall efficiency is only 12 percent. We expect that with higher quality glass plates and a less scattering recording material, the phase uniformity and efficiency can readily be increased.

Holographic Visor Displays (FIGS. 22–26)

In this application, planar (substrate-mode) optics schemes are exploited for recording holographic doublet visor display (HDVD), comprised of a corrected collimating lens and a simple linear grating. The lens collimates the light from the input display to form an array of plane waves, and diffracts these plane waves, so they will be trapped inside the substrate. The grating merely diffracts the trapped light outward. In order to achieve low aberrations, the collimating lens is recorded with pre-distorted waves which are derived recursively from holograms, recorded with spherical waves, whose readout geometries differ from those used during recording. An inherent advantage of these HDVD is that they can be incorporated into relatively compact systems. Our method is illustrated by designing and recording a compact HDVD. The recording was at a wavelength of 458 nm and the readout at 633 nm. The results reveal that that can handle field of view (FOV) of ±6°, with essentially diffraction-limited performance, and low chromatic sensitivity, can be readily achieved.

Figure 22:
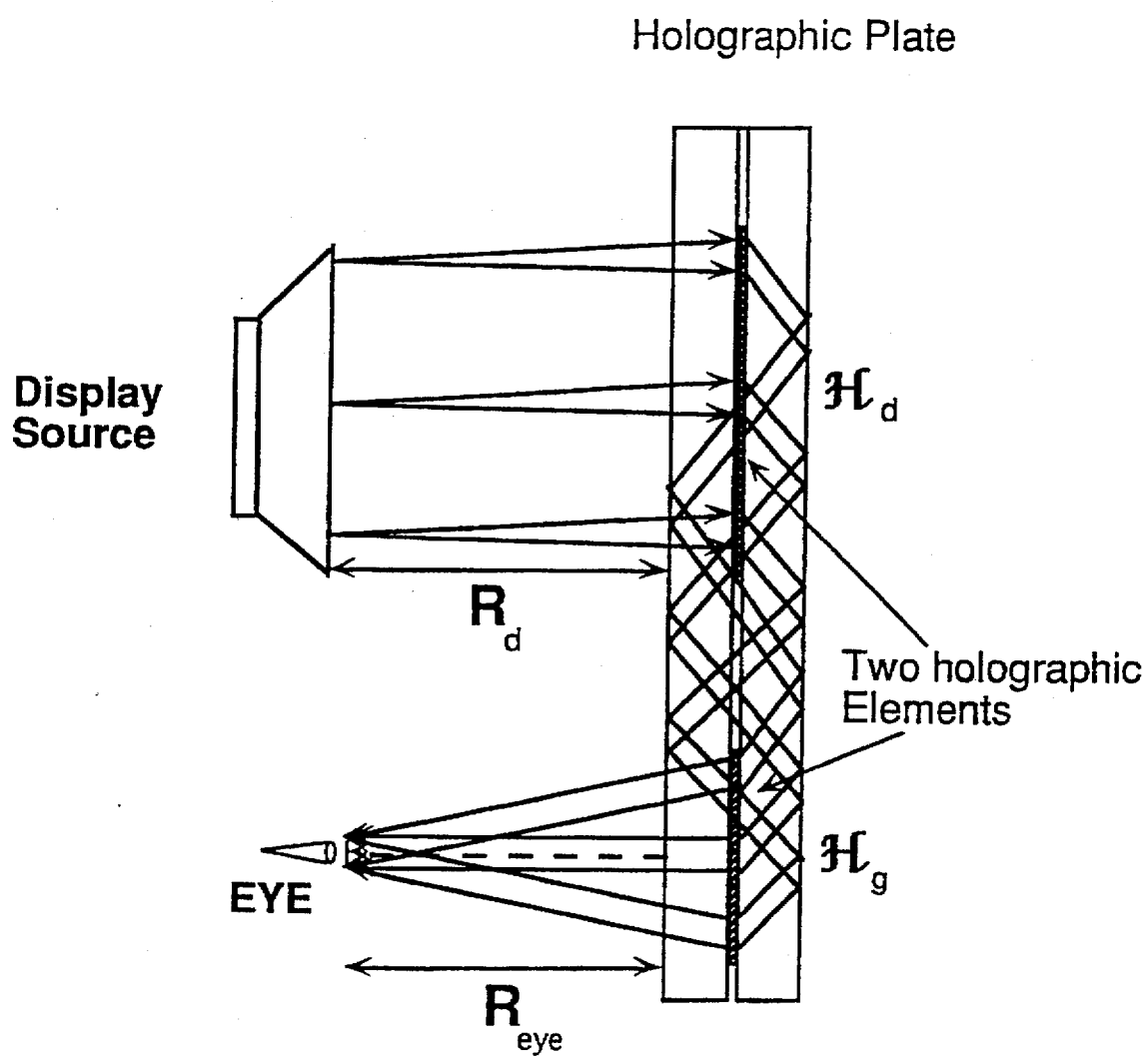
FIG. 22 illustrates the geometry of a planar optics holographic doublet for visor display.

The readout geometry for the HDVD is schematically presented in FIG. 22. The doublet is comprised of two holographic elements, a collimating lens $\mathcal{H}_d$, and a simple linear grating $\mathcal{H}_g$ both of which are recorded on the same substrate. A two-dimensional display is located at a distance $R_d$ from the center of $\mathcal{H}_d$, where $R_d$ is the focal length of $\mathcal{H}_d$. The light from the displays is thus transformed into an angular spectrum of plane wavefronts by $\mathcal{H}_d$. Specifically, each spatial frequency of the input is diffracted into a plane wave at an angle $\bar{\beta}_i^d(x)$ inside the substrate, where x is the lateral coordinate of $\mathcal{H}_d$. To assure that the image waves will be trapped inside the plate by total internal reflection, $\bar{\beta}_i^d(x)$ must satisfy the relation $$v \geq \sin \bar{\beta}_i^d(x) = v\sin \bar{\beta}_i^d(x) \geq 1, \qquad (29)$$

where $v$ is the refractive index of the glass plate. The linear grating $\mathcal{H}_g$ diffracts the trapped wavefronts outward. An observer, located at a distance $R_{eye}$, thus sees an image of the display, located at infinity. In reality, the light rays, emerging from the display, are collected and imaged by the HDVD onto the observer's eye. Nevertheless, it is more convenient to analyze the aberrations, caused by the HDVD, by inverting the direction of the light rays. Thus, the readout waves of $\mathcal{H}_g$ form an angular spectrum of plane waves (each having the diameter of the eye's pupil $d_{eye}$), that emerge from the eye and are focused by the HDVD onto the display plane. The central wave is focused to the center of the display, whereas the foci of the other waves are laterally displaced.

The design of the linear grating $\mathcal{H}_g$ is straightforward. It has a grating function $$H_g = \frac{2\pi}{\lambda_c} v \sin \bar{\beta}_i^g \cdot \epsilon,$$

where $\lambda_c$ is the readout wavelength, $\xi$ is the lateral coordinate of $\mathcal{H}_g$, and $\bar{\beta}_i^g(0) = \bar{\beta}_i^d(0)$ is the off-axis angle of the central ray inside the substrate. The design of the collimating lens $\mathcal{H}_d$ is much more complicated so we concentrate on it.

We begin with the basic relations for a simple, recorded with spherical waves, holographic imagery lens, given as $$\mu \left( \frac{1}{R_o} - \frac{1}{R_r} \right) = \frac{1}{R_d}, \qquad (30)$$

$$\mu(\sin \beta_r - \sin \beta_o) = \sin \beta_c,$$

where c, o and r are the indices for the reconstruction, object and reference waves, respectively, $R_q$ (q=o, r) is the distance between the respective point source and the center of the hologram, $\beta_q$ (q=o, r) is the respective off-axis angle, $\beta_c$ is defined as $\bar{\beta}_c = v\beta_c = v\bar{\beta}_i^g(0)$ and is the ratio between the readout and the recording wavelengths (i.e. $\mu = \lambda_c/\lambda_o$). Unfortunately, a simpler holographic lens, recorded with only spherical waves, has, in general, very large aberrations over the entire FOV. In order to compensate for the large aberrations, it is necessary to record the holographic lens with two aspherical waves.

There are several methods for designing and recording holographic imaging lens with low aberrations, as needed. The recursive design technique was chosen because the recording procedure is relatively simple and there is no need to resort to computer-generated holograms that require sophisticated recording equipment.

In this recursive design and recording method, aspheric wavefronts for recording the final collimating lens are derived from interim holograms. Specifically, the aspheric object and reference waves are derived from intermediate holograms, $\mathcal{H}^o$ and $\mathcal{H}^r$, respectively. (Note, from now on, the superscript o will denote all the parameters that are related to $\mathcal{H}^o$, and the superscript r the parameters related to $\mathcal{H}^r$).

In order to avoid large astigmatism and coma in the center of the FOV, the $\mathcal{H}_d$ must be recorded with a combination of plane waves and on-axis spherical waves. We now let the reference waves of $\mathcal{H}^o$ and $\mathcal{H}^r$ be plane waves, i.e., $R_r^o = R_r^r = \infty$. We also let the object and the reconstruction waves of $\mathcal{H}^o$ and $\mathcal{H}^r$ be spherical waves normal to the hologram plane, i.e., $\sin\beta_o^o = \sin\beta_o^r = \sin\beta_c^r = 0$. Thus, the imaging equations are rewritten as $$\mu\left(\frac{1}{R_o^o} + \frac{1}{R_c^o} - \frac{1}{R_o^r} - \frac{1}{R_c^r}\right) = \frac{1}{R_d}, \quad (31)$$

$$\mu(\sin\beta_c^o - \sin\beta_c^r) = \sin\beta_c.$$

It is apparent from FIG. 22 that when a single plane wave, representing a particular spatial frequency, is focused by $\mathcal{H}_d$ to a point in the output plane, it illuminates only part of the overall hologram. Thus, we may define, for each viewing angle, a local hologram whose aberrations must be determined and minimized. Let us consider the local hologram at a distance x from the center of the overall hologram. We denote the relevant parameters for the overall hologram as $R_q^p$, $\beta_q^p$, and those for the local hologram as $R_q^p(x), \beta_q^p(x)$, where q=o, c and p=o, r. Under the assumption of small angles, the parameters of the interim holograms, are $$\sin\beta_q^p(x) \simeq \frac{x}{R_q^p} - \frac{1}{2}\frac{x^3}{(R_q^p)^3}, \quad (32)$$

$$R_q^p(x) = \frac{R_q^p}{\cos\beta_q^p(x)} \simeq \quad (33)$$

$$\frac{R_q^p}{1 - \frac{1}{2}\sin^2\beta_q^p(x)} \simeq \frac{R_q^p}{1 - \frac{1}{2}\left(\frac{x}{R_q^p}\right)^2 + \frac{1}{2}\left(\frac{x}{R_q^p}\right)^4},$$

$$\sin\beta_r^p(x) = \sin\beta_r^p. \quad (34)$$

When $\Delta\bar{\beta}_c$ is sufficiently small, we may write $$\sin\bar{\beta}_c(x) = \sin(\bar{\beta}_c + \Delta\bar{\beta}_c) = \sin\bar{\beta}_c + \Delta\bar{\beta}_c\cos\bar{\beta}_c. \quad (35)$$

By using the holographic imaging equation, it is possible to derive, $$\sin(\bar{\beta}_c + \Delta\bar{\beta}_c) = \sin\bar{\beta}_c + \frac{\Delta\beta_c^g}{v} = \sin\bar{\beta}_c + \frac{\xi(x)}{vR_{eye}}. \quad (36)$$

Combining Eqs. (35) and (36), yields $$\Delta\bar{\beta}_c = \frac{\xi(x)}{vR_{eye}\cos\bar{\beta}_c}. \quad (37)$$

Figure 23:
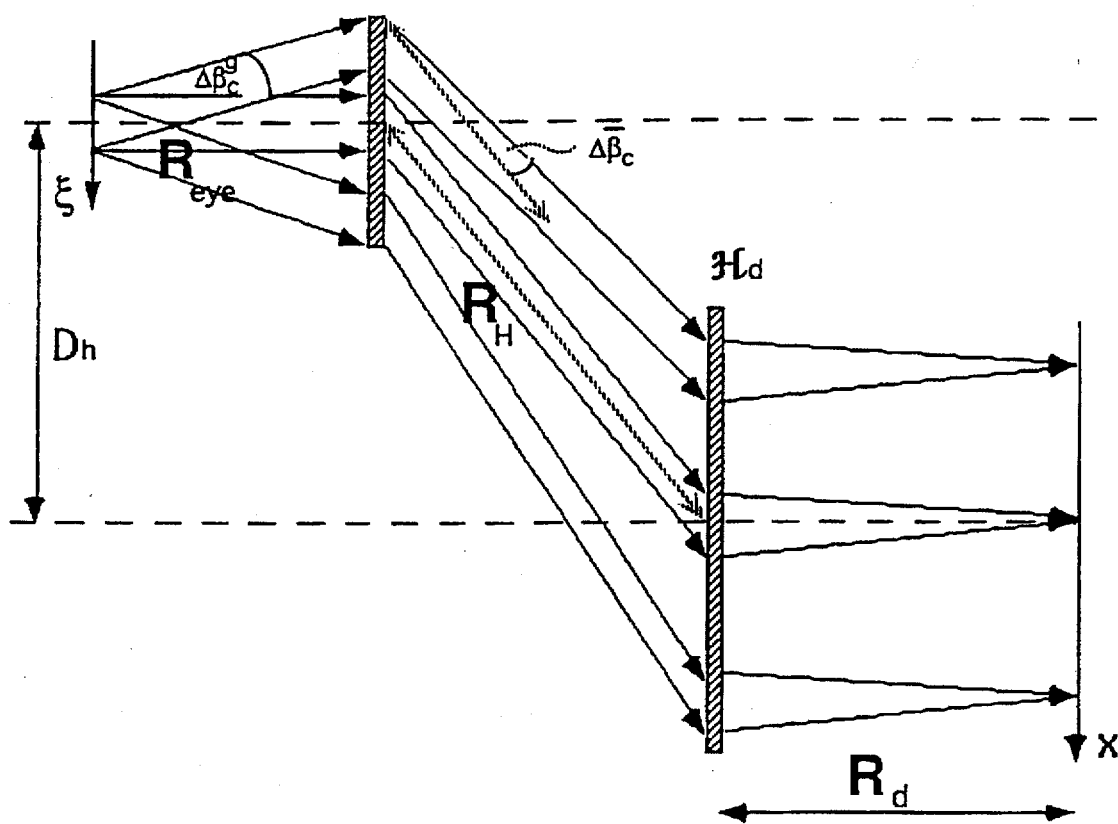
FIG. 23 illustrates the ,infolded configuration of the holographic doublet of FIG. 22.

In accordance with the geometry of FIG. 23, the relation between the lateral coordinate $\xi$ of $\mathcal{H}_g$, and the lateral coordinate x of $\mathcal{H}_d$, is $$\xi(x) = x - \frac{R_H\Delta\bar{\beta}_c}{\cos\bar{\beta}_c} = x - \frac{R_H\xi(x)}{vR_{eye}\cos^2\bar{\beta}_c}, \quad (38)$$

or $$\frac{\xi(x)}{vR_{eye}} = \frac{x}{vR_{eye} + \frac{R_H}{\cos^2\bar{\beta}_c}}, \quad (39)$$

where $R_H$ is the unfolded distance between the center of the two holograms. Substituting Eq. (39) into Eq. (36), yields $$\sin\bar{\beta}_c(x) = \sin\bar{\beta}_c + \frac{x}{vR_{eye} + \frac{R_H}{\cos^2\bar{\beta}_c}}. \quad (40)$$

Using Eqs. (32)–(34) and Eq. (40) it is possible to determine the relevant parameters of the image waves, as $$\sin\beta_i(x) = v\sin\bar{\beta}_c(x) + \quad (41)$$

$$\mu(\sin\beta_c^o(x) + \sin\beta_o^o(x) - \sin\beta_r^o(x) -$$

$$\sin\beta_c^r(x) - \sin\beta_o^r(x) + \sin\beta_r^r(x))$$

$$= \sin\bar{\beta}_c + \frac{x}{R_{eye} + \frac{R_H}{v\cos^2\bar{\beta}_c}} + \mu\left(x\left(\frac{1}{R_c^o} + \frac{1}{R_o^o} - \frac{1}{R_c^r} - \frac{1}{R_o^r}\right) - \sin\beta_r^o + \sin\beta_r^r\right)$$

$$= \frac{x}{R_{eye} + \frac{R_H}{v\cos^2\bar{\beta}_c}} - \frac{x}{R_d}$$

where i is the index for the image waves of $\mathcal{H}_d$. Finally, by letting $$R_d = R_{eye} + \frac{R_H}{v\cos^2\bar{\beta}_c},$$

we get the simple result of $$\cos\beta_i(x) = 0. \quad (42)$$

If the display surface is parallel to the hologram surface, then, $R_i(x) = -R_d$. Thus, using only the first and the second non-vanishing orders of $x/R_q^p$ in Eqs. (32) and (33), yields the various aberrations of the local hologram. These can be written as $$S(x) = \frac{-1}{R_i^3(x)} + \mu\sum_{\substack{p=o,r \\ q=c,o}}\epsilon_p\left(\frac{1}{R_q^p(x)}\right)^3 \quad (43)$$

$$= \frac{1}{R_d^3} +$$

$$\mu\left(\sum_{\substack{p=o,r \\ q=c,o}}\epsilon_p\left(\frac{1}{R_q^p}\right)^3 - \frac{3}{2}x^2\sum_{\substack{p=o,r \\ q=c,o}}\epsilon_p\left(\frac{1}{R_q^p}\right)^5\right),$$

$$C(x) = \mu\sum_{\substack{p=o,r \\ q=c,o}}\epsilon_p\frac{\sin\beta_q^p(x)}{(R_q^p(x))^2}$$

$$= \mu\left(x\sum_{\substack{p=o,r \\ q=c,o}}\epsilon_p\left(\frac{1}{R_q^p}\right)^3 - \frac{3}{2}x^3\sum_{\substack{p=o,r \\ q=c,o}}\epsilon_p\left(\frac{1}{R_q^p}\right)^5\right),$$

-continued $$A(x) = \mu \sum_{\substack{p=o,r \\ q=c,o}} \epsilon_p \frac{\sin^2 \beta_q^p(x)}{R_q^p(x)}$$

$$= \mu \left( x^2 \sum_{\substack{p=o,r \\ q=c,o}} \epsilon_p \left( \frac{1}{R_q^p} \right)^3 - \frac{3}{2} x^4 \sum_{\substack{p=o,r \\ q=c,o}} \epsilon_p \left( \frac{1}{R_q^p} \right)^5 \right),$$

$$F(x) = \frac{-1}{R_i(x)} + \mu \sum_{\substack{p=o,r \\ q=c,o}} \epsilon_p \frac{1}{R_q^p(x)}$$

$$= \mu \left( -\frac{x^2}{2} \sum_{\substack{p=o,r \\ q=c,o}} \epsilon_p \left( \frac{1}{R_q^p} \right)^3 + \frac{x^4}{2} \sum_{\substack{p=o,r \\ q=c,o}} \epsilon_p \left( \frac{1}{R_q^p} \right)^5 \right),$$

where S, C and A and denote the spherical, coma, astigmatism aberrations, respectively, and F the field curvature. Also, the parameter $\epsilon_{p=1}$ for p=o, and $\epsilon_p=-1$ for p=r. It is apparent from Eq. (43) that the first and the second orders of the aberrations C(x), A(x) and F(x) can be canceled simultaneously, if the following conditions are fulfilled $$\sum_{\substack{p=o,r \\ q=c,o}} \epsilon_p \left( \frac{1}{R_q^p} \right)^3 = \sum_{\substack{p=o,r \\ q=c,o}} \epsilon_p \left( \frac{1}{R_q^p} \right)^5 = 0. \quad (44)$$

The dominant aberration of $\mathcal{H}_d$ now becomes $S(x)=1/R_d^3$, but, since the diameter of the eye $d_{eye}$ is typically much smaller than the the focal length $R_d$, this spherical aberration is very small and its contribution to the overall spot size is small. The relations that describe the relevant parameters of the interim holograms are given in Eqs. (31) and (44). This is a set of four equations with six variables. There are an infinite number of solutions to this set, and the exact solution can be chosen from various considerations such as increasing the diffraction efficiency of $\mathcal{H}_d$ or simplifying the recording procedure.

The design procedure used is illustrated here for a HDVD having the following parameters:

$R_d$=86.75 mm, $R_H$=32.9 mm, $d_{eye}$=4 mm, $\beta_i^s=\beta_c=48°$, $R_{eye}$=40 mm, $D_h$=24 mm, $T_h$=3 mm, ν=1.5, $\lambda_o$=457.9 nm, $\lambda_c$=632.8 nm → μ=1.38, (45)

where $D_h$ is the lateral distance between the center of the two holograms, and $T_h$ is the thickness of the substrate. In order to illuminate $\mathcal{H}_d(0)$ with the full width of the image wave of $\mathcal{H}_g(o)$, we must fulfill the relation $2nT_h \tan \beta_i = D_h$, where n is an integer number. In our case, the desired relation is fulfilled with n=7. The performance of the doublet was checked over a FOV of ±6°, so the minimal angle inside the substrate is $$\nu \sin \beta_c^{min}(x) = \nu \sin \beta_c - \sin(6°) \rightarrow \sin \beta_c^{min}(x) = 42.4°. \quad (46)$$

Substituting Eq. (46) into Eq. (29), yields $$1.5 > \sin \beta_c^{min}(x) = 1.01 > 1. \quad (47)$$

Equation (47) demonstrates that the necessary condition for total internal reflection is fulfilled over the entire FOV of ±6°. Inserting the values of Eq. (45) into Eqs. (30) and (43) yields the parameters for $\mathcal{H}^o$ and $\mathcal{H}^r$, as $R_o^o$=−167.5 mm, $\beta_r^o$=−79.92°, $R_c^o$=−202.42 mm, $R_o^r$=−130 mm, $\beta_r^r$=−9.75°, $R_c^r$=202.02 mm. (48)

Figure 24:
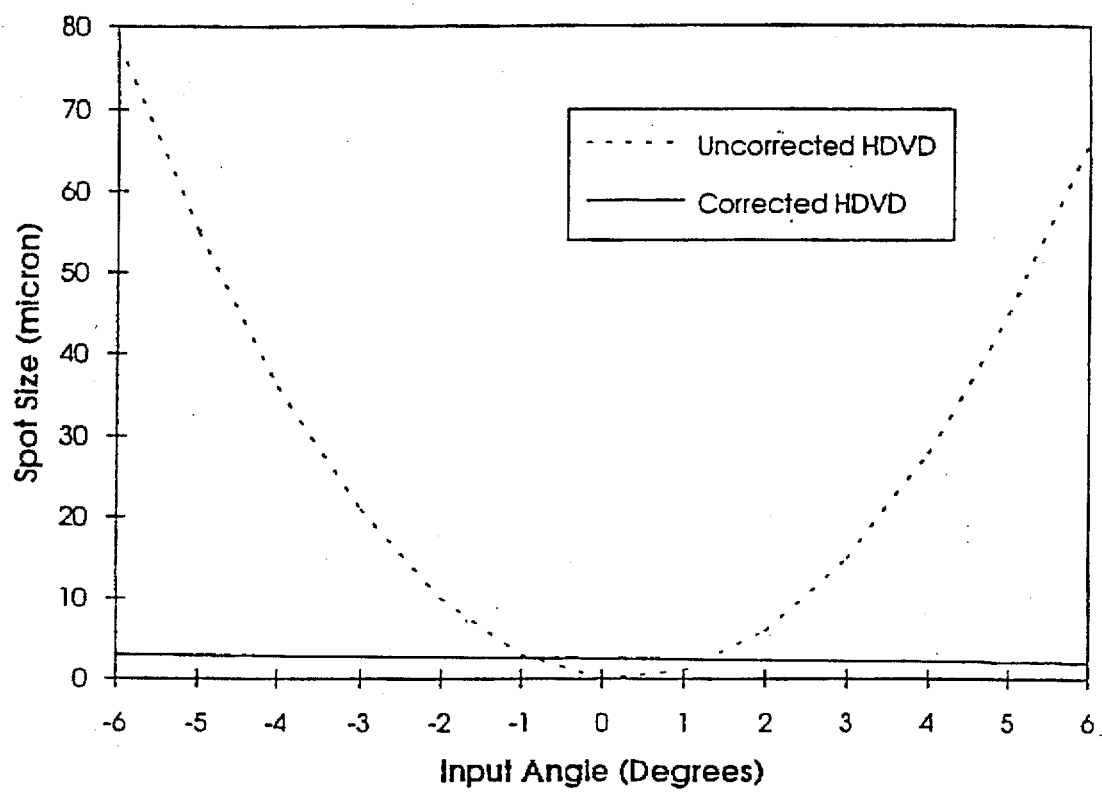
FIG. 24 illustrates the relationship of spot size to input angle in the display of FIG. 22.
Figure 26:
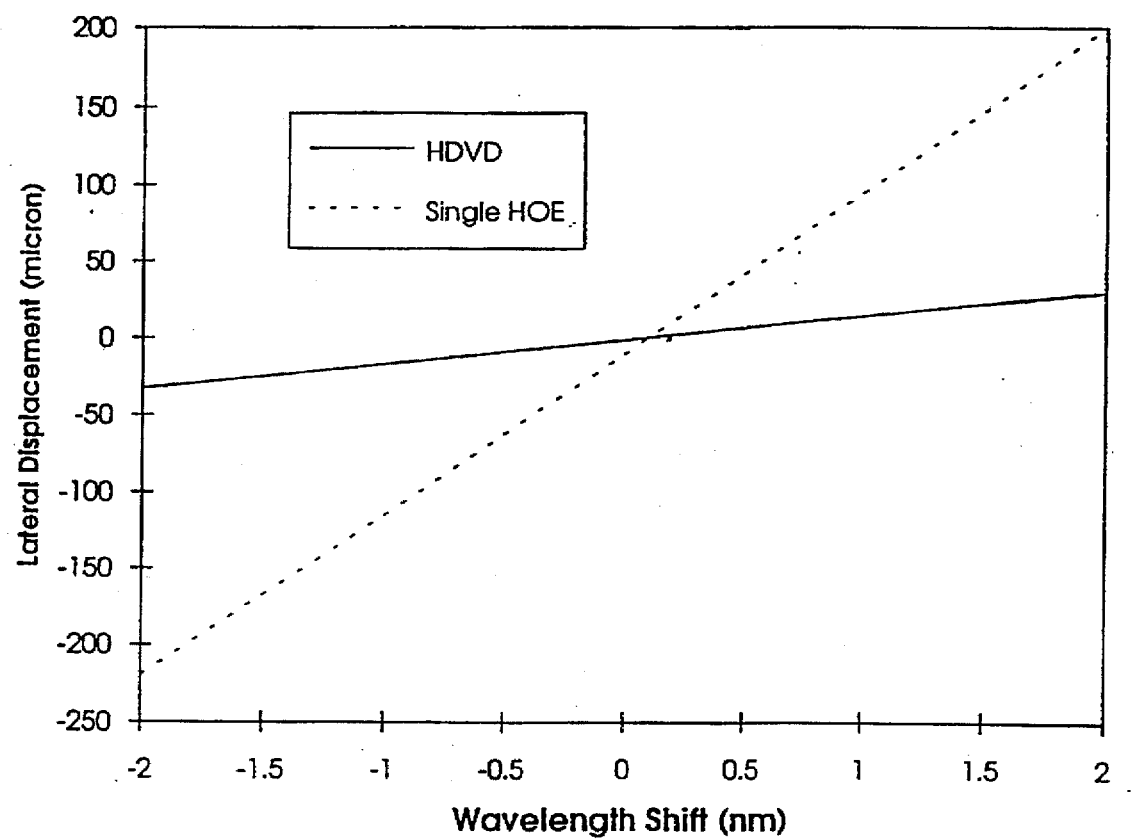
FIG. 26 illustrates the chromatic variations in the lateral focal position in the display of FIG. 22.

With the parameters of Eq. (48), a simulation was performed in order to calculate the spot sizes for a corrected HDVD denoted by $\mathcal{H}_1$, and for a noncorrected HDVD (which was recorded with spherical waves), denoted by $\mathcal{H}_2$. FIG. 24 shows the calculated spot sizes for a POV of ±6°. It is evident from the results that there is a significant improvement for $\mathcal{H}_1$. The spot sizes for $\mathcal{H}_1$ over the entire FOV are smaller than 33 μm, which is the diffraction-limited spot size, whereas those for $\mathcal{H}_2$ reach . . . To verify our design, we recorded the interim holograms $\mathcal{H}^o$ and $\mathcal{H}^r$. We transferred the exact image wavefronts from the interim holograms into the recording plane of the final element $\mathcal{H}_1$, with the help of an intermediate hologram arrangement. The element $\mathcal{H}_1$ was then tested by introducing plane waves from a rotating mirror at the location of the eye. FIG. 25 shows the experimental results for a FOV of ±6°. These results illustrate that $\mathcal{H}_1$ indeed has an essentially diffraction-limited performance.

To illustrate the improved chromatic sensitivity of the HDVD we calculated the maximum lateral dispersion as a function of the output wavelength shift $\Delta\lambda_c$ for two different visor displays. One was comprised of a single holographic element, and the other was comprised of HDVD with planar optics. The results are presented in FIG. 26. As shown, inside a bandwidth of ±2 nm, the lateral dispersion for the visor display with the HDVD is smaller than the diffraction-limited spot size. Moreover, this lateral dispersion is better by a factor of 7 than the lateral dispersion for the visor display with the single HOE.

Described above is a method for designing and recording a compact substrate-mode holographic doublet visor display, in the presence of a wavelength shift. It is capable of providing excellent imaging and relatively low chromatic dispersion over a wide FOV. Both the design and the recording procedures are fairly simple, where there is no need to resort to complicated computer-generated-holograms nor to aspherical lenses. This design and recording procedures need not be confined to visor displays applications, but can be exploited in others, such us Head-Up Displays (HUDs) for aircrafts and cars.

While the invention has been described with respect to several preferred embodiments, it will be appreciated that these are set forth merely for purposes of example, and that many other variations, modifications and applications of the invention may be made.

We claim:

1. A holographic optical device, for the transmission of optical signals of a plurality of channels each of a different wavelength between (a) a plurality of optical transmission paths, one for each channel, and (b) a single optical transmission path for all the channels, comprising: a light-transmissive substrate; a first holographic optical element carried by said substrate; and at least two further holographic optical elements carried by said substrate laterally of said first holographic optical element; characterized in that:

at least one of said holographic optical elements is diffraction grating that can handle a multiplicity of plane waves and/or spherical waves having a range of wavelengths; and said holographic optical elements include a single hologram associated with said single optical transmission path and having a plurality of optical elements, one for each of said channels and a plurality of holograms, each aligned with one of said plurality of optical transmission paths, and having a single hologram optical element for the channel of the respective path.

2. The device according to claim 1, wherein said device is a demultiplexer for demultiplexing the optical signals transmitted from the single optical transmission path to the plurality of optical transmission paths; said single hologram of the holographic device being aligned with said single optical transmission path, and its plurality of holographic optical elements being effective to collimate the light of the plurality of channels and to diffract said light in a different direction for each channel; each of said plurality of holograms of the holographic device being aligned with one of said plurality of optical transmission paths, and its holographic optical element being effective to focus the collimated light of the respective channel onto its respective optical transmission path.

3. The device according to claim 1, wherein said device is a multiplexer multiplexing the optical signals transmitted from the plurality of optical transmission paths to the single optical transmission path; each of said plurality of holograms of the holographic device being aligned with one of said plurality of optical transmission paths, and its holographic optical element being effective to collimate the light of the respective channel and to diffract it in a different direction for each channel; said single hologram of the holographic device being aligned with said single optical transmission path, and its plurality of holographic optical elements being effective to focus the collimated light of the respective channel onto the single optical transmission path.

4. The device according to claim 3 for multiplexing the optical signals transmitted through the plurality of optical transmission paths to the single optical transmission path and also comprising a demultiplexer for demultiplexing the optical signals transmitted through the single optical transmission path to the plurality of optical transmission paths.

5. The device according to claim 1, wherein each of said optical transmission paths is defined by an optical fiber.

6. The device according to claim 1, wherein each of said holographic optical elements has high diffraction efficiency for the wavelength of its respective channel and low diffraction efficiency for all other wavelengths.

7. The device according to claim 1, wherein said substrate includes a light transparent plate and an emulsion coating thereon on which said holographic optical elements are recorded.

* * * * *